(12) United States Patent
Yamada et al.

(10) Patent No.: US 7,438,424 B2
(45) Date of Patent: Oct. 21, 2008

(54) ILLUMINATION OPTICAL APPARATUS AND PROJECTION TYPE DISPLAY APPARATUS

(75) Inventors: Ryuuji Yamada, Tokyo (JP); Katsuyuki Takeuchi, Tokyo (JP)

(73) Assignees: Kyocera Corporation, Kyoto (JP); NEC Display Solutions, Ltd., Tokyo (JP)

( * ) Notice: Subject to any disclaimer, the term of this patent is extended or adjusted under 35 U.S.C. 154(b) by 523 days.

(21) Appl. No.: 11/285,460

(22) Filed: Nov. 21, 2005

(65) Prior Publication Data
US 2006/0114676 A1    Jun. 1, 2006

(30) Foreign Application Priority Data
Nov. 29, 2004    (JP)    ............................. 2004-344867

(51) Int. Cl.
G03B 21/20    (2006.01)
G03B 21/28    (2006.01)
F21V 7/04    (2006.01)
G02B 6/00    (2006.01)
G02B 3/00    (2006.01)
G02B 27/10    (2006.01)
G02B 27/30    (2006.01)

(52) U.S. Cl. .................. 353/102; 353/99; 362/551; 362/296; 362/302; 362/347; 359/434; 359/623; 359/641; 359/649

(58) Field of Classification Search ............. 353/102, 353/37, 98, 99; 362/551, 243, 245, 247, 362/296, 302, 327, 341, 346; 359/362, 434–435, 359/621–623, 641, 649, 794, 863
See application file for complete search history.

(56) References Cited

U.S. PATENT DOCUMENTS

| 5,902,033 A | * | 5/1999 | Levis et al. ................. 353/122 |
| 2004/0227910 A1 | * | 11/2004 | Akiyama et al. ............ 353/102 |
| 2005/0068507 A1 | * | 3/2005 | Akiyama .................... 353/102 |

FOREIGN PATENT DOCUMENTS

| JP | 07-161601 | 6/1995 |
| JP | 2000-221585 | 8/2000 |
| JP | 2000-241878 | 9/2000 |

* cited by examiner

*Primary Examiner*—Rochelle-Ann Blackman
(74) *Attorney, Agent, or Firm*—Hogan & Hartson LLP

(57) ABSTRACT

An illumination optical apparatus and a projection type display apparatus capable of enhancing an illumination efficiency; having an ellipsoidal mirror, a light source arranged at a first focal point of the ellipsoidal mirror, a stop arranged closer to said light source side by a predetermined distance from a second focal point of said ellipsoidal mirror, and a positive refractive collimator lens for collimating a light flux emitted from the stop to a parallel light flux. A condition ($0.01 < L2/L1 < 0.06$) is satisfied where, $L1$ is a distance from an apex of the ellipsoidal mirror to the second focal point thereof and, $L2$ (the light source side is a positive distance) is a distance from the second focal point of the ellipsoidal mirror to the stop.

6 Claims, 19 Drawing Sheets

101b

STATE 1 IN FIRST EMBODIMENT

STATE 2 IN FIRST EMBODIMENT

STATE 1 IN SECOND EMBODIMENT

STATE2 IN SECOND EMBODIMENT

SPHERICAL ABERRATION

F 3.0

FIELD CURVATURE

Y=12.0

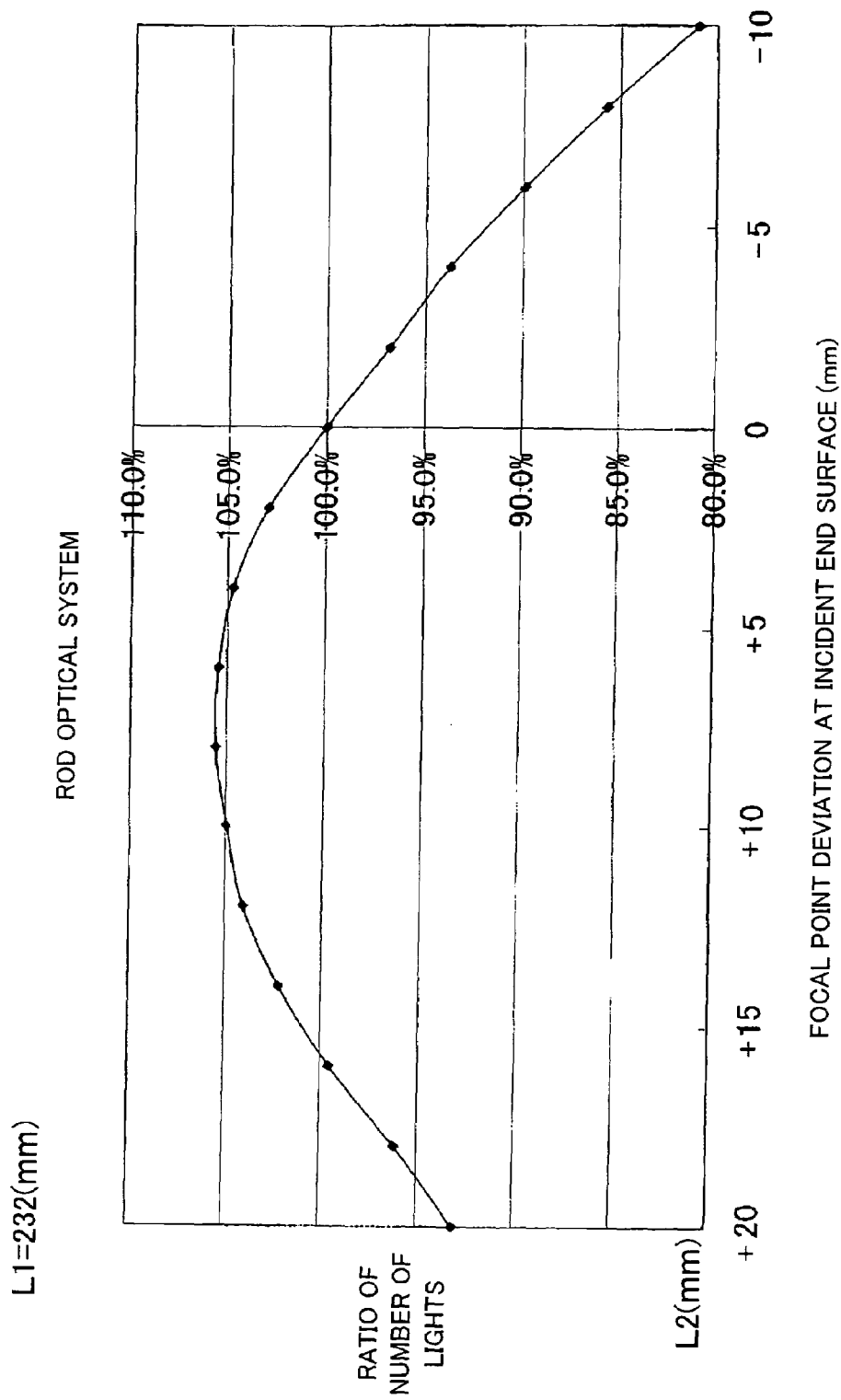

ILLUMINATION OPTICAL APPARATUS AND PROJECTION TYPE DISPLAY APPARATUS

BACKGROUND OF THE INVENTION

1. Field of the Invention

The present invention relates to an illumination optical apparatus, wherein a light source system providing an illumination light includes an ellipsoidal mirror, and a projection type display apparatus using the same.

2. Description of the Related Art

For example, an illumination optical apparatus used in a projection type display apparatus (projector), etc. provided with a liquid crystal display device is configured to include a pair of fly-eye lenses.

In such an illumination optical apparatus including a pair of fly-eye lenses, the pair of fly-eye lenses uniformize (equalize) a light intensity distribution of an illumination light from a light source and emit to an illumination surface of, for example, a liquid crystal display panel functioning as a spatial light modulation device, etc.

The following publications disclose such a projection type display apparatus and an illumination optical apparatus.

The Japanese Unexamined Patent Publication (kokai) No. 2000-241878-A discloses a projection type display apparatus using a light source composed of a paraboloidal reflector and a lamp, capable of obtaining higher screen illumination by arranging a condenser lens in front of the paraboloidal reflector.

The Japanese Unexamined Patent Publication (kokai) No. 2000-221585-A discloses an apparatus having a light source set to have a cathode displaced to the opening side by a predetermined distance (particularly, refer to FIG. 2).

The Japanese Unexamined Patent Publication (kokai) No. 7-161601-A discloses an illumination optical apparatus including a fly-eye integrator, wherein a stop is provided on an incident surface and emission surface of the fly-eye integrator and the fly-eye integrator is movable in an optical axis direction.

An illumination optical system in the apparatuses explained above is basically composed of an ellipsoidal mirror, a light source for emitting a light by discharging due to a direct current between positive and negative electrodes, and a collimator lens for collimating a light flux converged by the ellipsoidal mirror to an approximately parallel light flux, when the ellipsoidal mirror and the collimator lens are arranged to have an identical focal point. The stop is arranged at the second focal point of the ellipsoidal mirror.

However, in the above illumination optical apparatus, the ellipsoidal focal point and the collimator lens focal point are brought to be identical to obtain a parallel light flux when the light source is sufficiently small to be deemed as a point source, but in the case of a high output lamp, the electrode interval is wide, so that when it is handled as a point source, an optimal illumination efficiency cannot be obtained. Furthermore, in the case where a direct current lighting is carried out, since a highest-intensity luminous point exists close to one electrode, a center of the brightness distribution is deviated from the midpoint of the electrodes and the distribution becomes uneven.

SUMMARY OF THE INVENTION

An object of the present inventions is to provide an illumination optical apparatus and a projection type display apparatus capable of enhancing the illumination efficiency.

According to the present invention, there is provided anilumination optical apparatus including: an ellipsoidal mirror; a light source arranged at a first focal point of the ellipsoidal mirror; a stop arranged closer to the light source side by a predetermined distance from a second focal point of the ellipsoidal mirror; and a positive refractive collimator lens for collimating a light flux emitted from the stop to a parallel light flux. And, the following condition (equation) is satisfied:

$$0.01 < L2/L1 < 0.06$$

where, L1 is a distance from an apex of the ellipsoidal mirror to the second focal point thereof and, L2 (the light source side is a positive distance) is a distance from the second focal point of the ellipsoidal mirror to the stop.

Preferably, the illumination optical apparatus further includes a first fly-eye lens having a positive refractive power arranged on the collimator lens side; a second fly-eye lens having a positive refracting power, arranged on the emission side being approximately in parallel with the first fly-eye lens; and a relay lens system for guiding a light flux from the second fly-eye lens to an illumination surface.

According to a second aspect of the present invention, there is provided anillumination optical apparatus, including: an ellipsoidal mirror; a light source arranged at a first focal point of the ellipsoidal mirror; and a rod integrator arranged closer to the light source side by a predetermined distance from a second focal point of the ellipsoidal mirror. And, the following condition is satisfied:

$$0.01 < L2/L1 < 0.06$$

where, L1 is a distance from an apex of the ellipsoidal mirror to the second focal point thereof and, L2 (the light source side is a positive distance) is a distance from the second focal point of the ellipsoidal mirror to an incident surface of the rod integrator.

Preferably, the illumination optical apparatus further includes a relay lens system for guiding a light flux from the rod integrator to an illumination surface.

According to a third aspect of the present invention, there is provided a projection type display apparatus, including: an image display device; and an illumination optical apparatus for irradiating an illumination light to the image display device; wherein the illumination optical apparatus includes an ellipsoidal mirror, a light source arranged at a first focal point of the ellipsoidal mirror, a stop arranged closer to the light source side by a predetermined distance from a second focal point of the ellipsoidal mirror, a positive refractive collimator lens for collimating a light flux emitted from the stop to a parallel light flux, a first fly-eye lens having a positive refracting power arranged on the collimator lens side, a second fly-eye lens having a positive refracting power arranged on the emission side to be approximately in parallel with the first fly-eye lens, and a relay lens system for guiding a light flux from the second fly-eye lens to an illumination surface. And the following condition is satisfied:

$$0.01 < L2/L1 < 0.06$$

where, L1 is a distance from an apex of the ellipsoidal mirror to the second focal point thereof and, L2 (the light source side is a positive distance) is a distance from the second focal point of the ellipsoidal mirror to the stop.

According to a fourth aspect of the present invention, there is provided a projection type display apparatus, including an image display device; and an illumination optical apparatus for irradiating an illumination light to the image display device; wherein the illumination optical apparatus includes an ellipsoidal mirror, a light source arranged at a first focal point of the ellipsoidal mirror, a rod integrator arranged closer to the light source side by a predetermined distance from a second focal point of the ellipsoidal mirror, and a relay lens system for guiding a light flux from the rod integrator to an illumination surface. And, the following condition is satisfied:

$$0.01 < L2/L1 < 0.06$$

Where, L1 is a distance from an apex of the ellipsoidal mirror to the second focal point thereof and, L2 (the light source side is a positive distance) is a distance from the second focal point of the ellipsoidal mirror to an incident surface of the rod integrator.

According to the present invention, an illumination efficiency of the illumination optical apparatus and the projection type display apparatus can be improved.

BRIEF DESCRIPTION OF DRAWINGS

These and other objects and features of the present invention will become clearer from the following description of the preferred embodiments given with reference to the attached drawings, in which:

FIG. 4A and FIG. 4B are views showing positional relationships between a focal point of an ellipsoidal mirror and that of a collimator lens, wherein FIG. 4A shows a positional relationship in an apparatus of the related art and FIG. 4B shows a positional relationship according to a first embodiment;

FIG. 5A to FIG. 5C are views showing a relationship between a point source and an ellipsoidal focal point, wherein FIG. 5A is a view of an optical path when the point source is displaced by 0.5 mm from the ellipsoidal focal point to the side of an apex of the reflection mirror, FIG. 5B is a view of an optical path when the point source becomes identical to the ellipsoidal focal point, and FIG. 5C is a view of an optical path when the point source is displaced by 0.5 mm from the ellipsoidal focal point to the side of an opening of the reflection mirror;

FIG. 22A and FIG. 22B are views showing positional relationships between a focal point of an ellipsoidal mirror and an incident end surface of a rod, wherein FIG. 22A shows a positional relationship between an apparatus of the related art and FIG. 22B shows a positional relationship according to the second embodiment; and FIG. 23 is a view showing changes of the DMD incident light intensity with respect to a deviation amount of a focal point of an incident end surface according to the second embodiment.

DESCRIPTION OF THE PREFERRED EMBODIMENT

Below, the preferred embodiments of the present invention will be explained with reference to the attached drawings.

First Embodiment

Figures 1A, 1B:
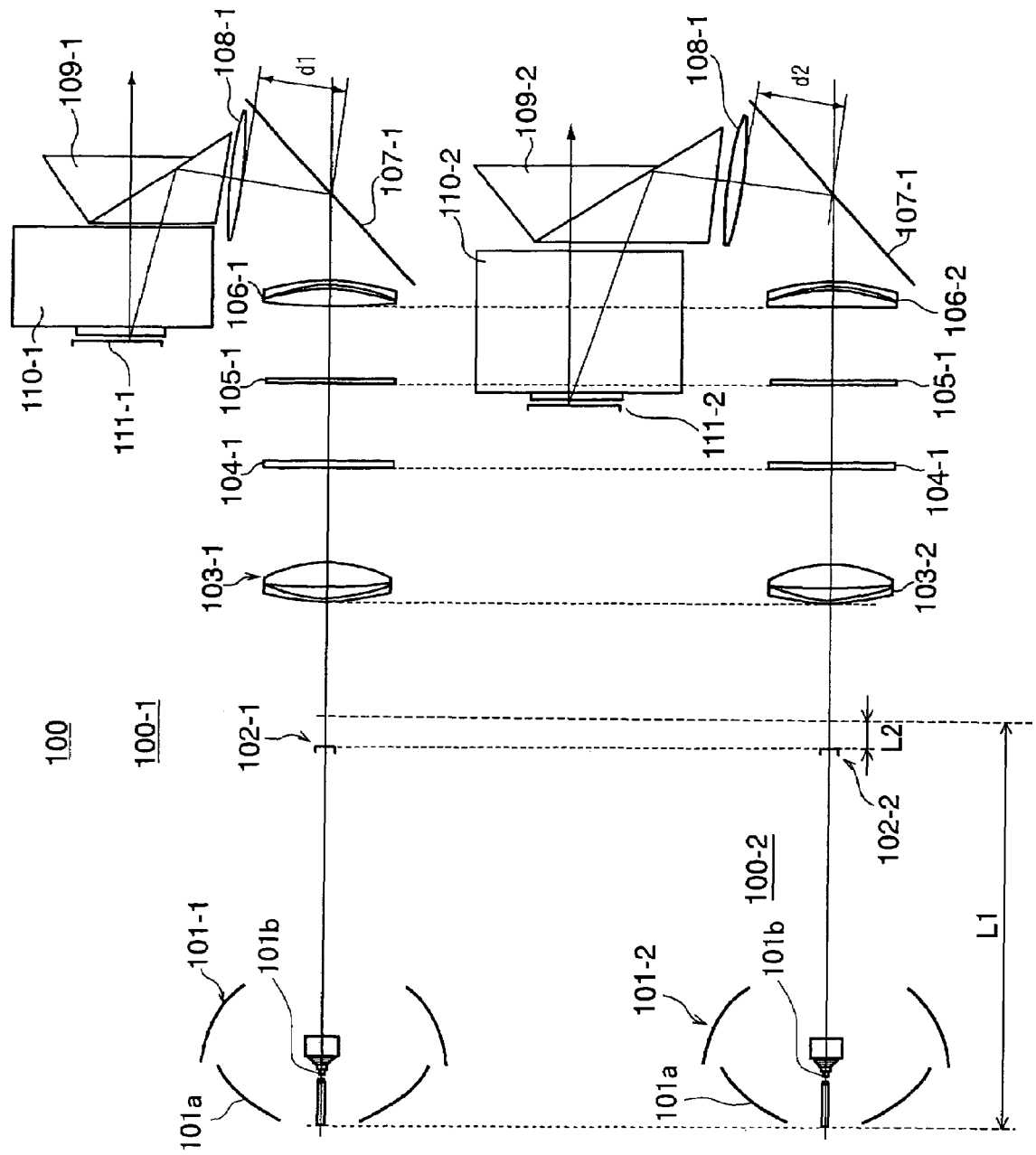
FIG. 1A and FIG. 1B are views of an optical system showing the configuration in a first mode and that in a second mode of a projection type display apparatus according to a first embodiment of the present invention.

FIG. 1A and FIG. 1B are views of an optical system showing the configuration in a first mode and that in a second mode of a projection type display apparatus according to a first embodiment of the present invention: wherein FIG. 1A shows the configuration in the first mode and FIG. 1B shows the configuration in the second mode.

Note that the unit is "mm" in a distance, length and interval, etc. in the present embodiment.

A projection type display device 100 of the present embodiment basically includes a light source unit 101, stop (aperture) 102, collimator lens 103, first fly-eye lens 104, second fly-eye lens 105, first relay lens group (also referred to as a first lens group) 106, deflection mirror 107, second relay lens group (also referred to as a second lens group) 108, TIR (Total Internal Reflection) prism 109, color separation/composition prism 110 and reflection type image display device 111.

A projection type display apparatus 100-1 in the first mode of the present embodiment has a light source unit 101-1, stop (aperture) 102-1, collimator lens 103-1, first fly-eye lens 104-1, second fly-eye lens 105-1, first relay lens group (also referred to as a first lens group) 106-1, deflection mirror 107-1, second relay lens group (also referred to as a second lens group) 108-1, TIR prism 109-1, color separation/composition prism 110-1 and reflection type image display device 111-1.

Similarly, a projection type display apparatus 100-2 in the second mode of the present embodiment has a light source unit 101-2, stop (aperture) 102-2, collimator lens 103-2, first fly-eye lens 104-2, second fly-eye lens 105-2, first relay lens group (also referred to as a first lens group) 106-2, deflection mirror 107-2, second relay lens group (also referred to as a second lens group) 108-2, TIR prism 109-2, color separation/composition prism 110-2 and reflection type image display device 111-2.

In the projection type display apparatus 100-1 in the first mode and that 100-2 in the second mode of the present embodiment, the first fly-eye lens 104 (104-1 and 104-2) and the second fly-eye lens 105 (105-1 and 105-2) are arranged at each other's focal points.

Also, in the projection type display apparatus 100-1 in the first mode and in the projection type display apparatus 100-2 in the second mode of the present embodiment, the mirror 107 (107-1 and 107-2) for bending an optical path is arranged between the first relay lens group 106 (106-1 and 106-2) and the second relay lens group 108 (108-1 and 108-2).

In the projection type display apparatus of the present embodiment, the first fly-eye lens and the second fly-eye lens are arranged at each other's focal points, and a relay lens systems having the same focal length, but having different back focus are arranged in the same way as explained above, so that a housing of the lens can be used in common even when a shape of the image display device and an optical path length in the prism are different.

Specifically, to be compatible with the use of prisms having different optical path lengths, each of first and second relay lens groups having the same focal length but having different back-focus is configured to satisfy the condition formulas below.

$$e1 = -(\varnothing - \varnothing 11 - \varnothing 12)/(\varnothing 11 \times \varnothing 12) \quad (1)$$

$$e2 = -(\varnothing - \varnothing 21 - \varnothing 22)/(\varnothing 21 \times \varnothing 22) \quad (2)$$

$$\varnothing 11 = (1 - fb1 \times \varnothing)/e1 \quad (3)$$

$$\varnothing 21 = (1 - fb2 \times \varnothing)/e2 \quad (4)$$

$$0.95 < e1/e2 < 1.05 \quad (5)$$

$$1.1 \times (1 - e1 \times \varnothing)/\varnothing < fb < f \times 0.9 \quad (6)$$

where, $\varnothing$ indicates a refracting power of the entire relay lens system (inverse number of focal length), $\varnothing 11$ indicates a refracting power of a first lens group in the first mode, $\varnothing 12$ indicates a refracting power of the second lens group in the first mode, $\varnothing 21$ indicates a refracting power of the first lens group in the second mode, $\varnothing 22$ indicates a refracting power of the second lens group in the second mode, e1 indicates a paraxial inter-group distance between the first lens group and the second lens group in the first mode, e2 indicates a paraxial inter-group distance between the first lens group and the second lens group in the second mode, fb1 indicates a paraxial back focus of the relay lens system against an infinite light flux in the first mode, and fb2 indicates a paraxial back focus of the relay lens system against an infinite light flux in the second mode, respectively.

If satisfying the above conditions, an optical system, wherein an optical element can be arranged in a common housing even when a shape of the optical element is changed, can be provided in the projection type display apparatus of the present embodiment.

The above condition formulas (1) to (5) express paraxial relationships between the first lens group and the second lens group when two different relay lens systems have the same focal length but different back-focus.

The formulas (1) to (4) are general paraxial formulas and the formula (5) expresses a condition, under which a distance between the first lens group and the second lens group does not change largely between the first mode and the second mode and a common housing can be used.

As a result, since only a back-focus can be changed while maintaining the focal length, it is compatible with a change of the optical path length of the prism.

The formula (6) is a condition, under which refracting powers of the first lens group and the second lens group can be suitably distributed and a preferable focusing performance of a relay lens system can be obtained.

When a back-focus is smaller than the lower limit of the formula (6), a refracting power of the second lens group becomes low and the refracting power depends on the first group, and thus it is not preferable for an aberration correction. On the other hand, when the back-focus is larger than the upper limit of the formula (6), a refracting power of the first lens group becomes low and the refracting power leans to the second lens group, and thus it is not preferable, similar to the above.

When changing a size of the image display device, to keep the arrangement of the fly-eye lenses at a be constant, it is necessary to satisfy the condition that the two fly-eye lenses have the same shape, are made by the same material, and are arranged approximately at each other's focal points, and only a shape of the cell is changed along with the change of the image display device.

An illumination area of the illumination optical system is formed so that a shape of a lens cell aperture of the first fly-eye lens is enlarged and projected on the image display device by the second fly-eye lens and the relay lens system. Since the magnification is determined by a ratio of a focal length of the second fly-eye lens and a focal length of the relay lens system, by keeping the focal lengths of the fly-eye lens and the relay lens system at a constant, the magnification can be kept at a constant. By keeping the magnification at a constant, it becomes possible to be compatible with to a change of a size of the image display device only by changing a shape of the aperture of the fly-eye lens cell.

By keeping the focal length of the relay lens system at a constant, the mutual arrangement of the first and second fly-eye lenses can be always maintained at a constant regardless of a shape of the image display device and a back-focus of the relay lens system.

As explained above, when two fly-eye lenses are arranged at each other's focal points and a power arrangement of the relay lens groups satisfies the condition formulas (1) to (6), it becomes possible for the common housing to be compatible with a change of a size of the image display device and an optical path length of the prism.

In the illumination optical apparatus of the present embodiment, a light source unit 101 is configured to include an ellipsoidal mirror 101a and a lamp light source 101b arranged at a first focal point of the ellipsoidal mirror, and the stop (aperture) 102 is arranged at a position close to the light source side by a predetermined distance from a second focal point of the ellipsoidal mirror 101a.

In the present embodiment, the light source unit 101 is configured as below:
(Condition Formula 1)

$$0.01 < L2/L1 < 0.06$$

where, L1 is a distance from an apex of the ellipsoidal mirror 101a to the second focal point thereof, and
L2 (the light source side is a positive distance) is a distance from the second focal point of the ellipsoidal mirror 101a to the stop 102.

Note that the condition formula 1 is defined on the basis of an improvement of an illumination efficiency by about 2.5%, and it is defined to satisfy the following condition, for the improvement by about 5%.
(Condition Formula 2)

$$0.022 < L2/L1 < 0.053$$

Below, the specific configuration and function of each part in FIG. 1, an evaluation based on specific values of the condition formulas and consideration thereon will be explained in order.

Note that, in FIG. 1A and FIG. 1B, the image display devices 111-1 and 111-2 are reflection type image display elements, such as a DMD (Digital Micromirror Display), wherein the image display ranges are different. Also, the TIR prisms 109-1 and 109-2 and the color separation composition prisms 110-1 and 110-2 have different optical path lengths.

The light source unit 101 (101-1 and 101-2) is configured to include a light source 101b, such as a halogen lamp and a metal halide lamp, and an ellipsoidal mirror 101a and emits a white illumination light.

The stop 102 (102-1 and 102-2) has a rectangular aperture and blocks (stops) an unnecessary light flux in an illumination light from the light source unit 101.

Figure 2:
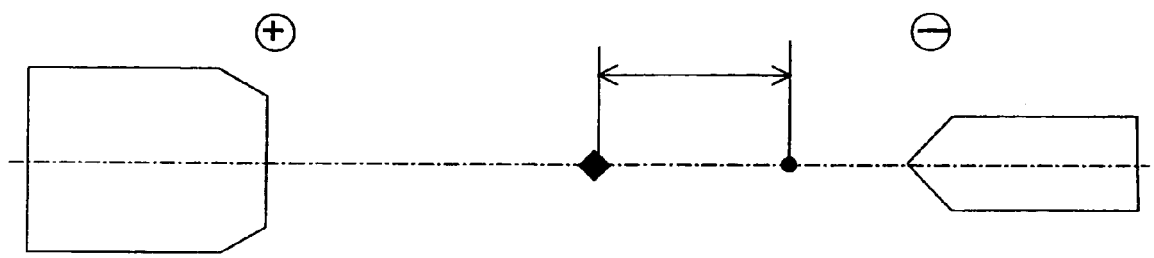
FIG. 2 is a view for explaining a positional relationship between electrodes of a light source unit and an ellipsoidal focal point according to the present embodiment.
Figure 3:
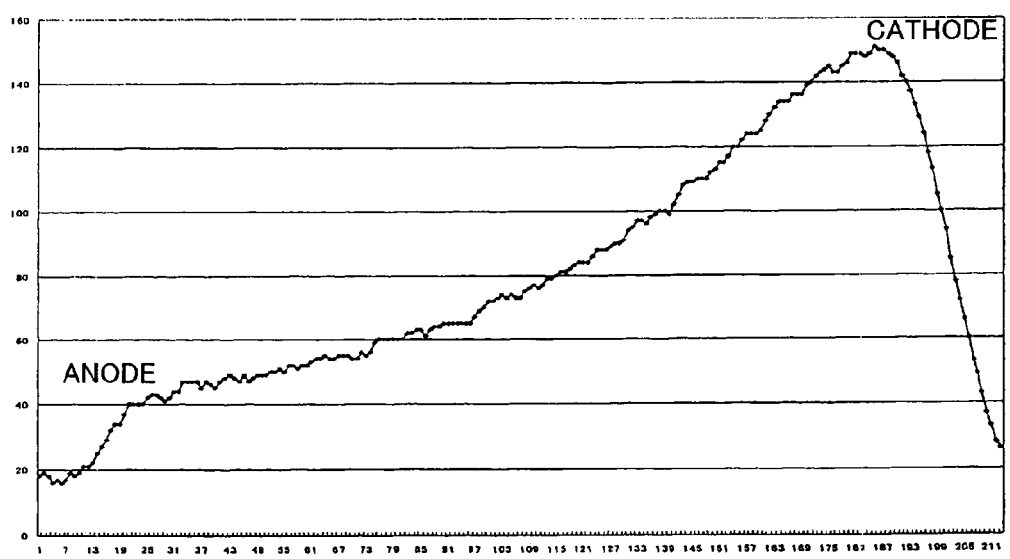
FIG. 3 is a view of an example of a brightness distribution between electrodes of a direct-current drive light source.

FIG. 2 is a view for explaining a positional relationship between electrodes of a light source unit and an ellipsoidal focal point according to the present embodiment, and FIG. 3 is a view of an example of a brightness distribution between electrodes of a direct-current driven light source.

As shown in FIG. 2, the light source 101a is arranged, where the anode (+) is positioned at the side of the reflection mirror opening and the cathode (−) is positioned at the side of the reflection mirror apex.

Also, as shown in FIG. 3, a high-intensity luminous point is positioned at the cathode side, and the midpoint of the electrodes is arranged at a position displaced by 0.5 mm to the reflection mirror opening side from the ellipsoidal first focal point. An interval between the electrodes is 3.5 mm, the first focal length of the ellipsoidal mirror is 31.0 mm and a second focal length thereof is 201 mm.

In this configuration, a light unable to be trapped directly by the ellipsoidal mirror is reflected to the ellipsoidal focal point by a spherical reflection mirror and a center of the spherical surface is made approximately identical with the ellipsoidal first focal point. The aperture stop 102 is arranged at a positioned displaced from the ellipsoidal second focal point to the light source side by 8 mm, and thus the illumination efficiency is improved.

The collimator lens 103 (103-1 and 103-2) has a positive refracting power and generates an approximately parallel light by making the focal point on the light source side identical with the position of the stop.

The parallel light flux from the collimator lens 103 is divided by the first fly-eye lens 104 (104-1 and 104-2) and generates a plurality of light source images on the second fly-eye lens 105 (105-1 and 105-2).

The second fly-eye lens 105 (105-1 and 105-2) is arranged at a focal point of the first fly-eye lens 104 (104-1 and 104-2). The first lens group, mirror 107 (107-1 and 107-2) and the second lens group 108 (108-1 and 108-2) composing the relay lens group together with the second fly-eye lens 105 (105-1 and 105-2) have a function of superimposing and focusing an image of a lens cell of the first fly-eye lens 104 (104-1 and 104-2) on the image display device 111 (111-1 and 111-2).

The image display device 111 (111-1 and 111-2) is the DMD, which reflects an illumination light to the direction of the projection lens and repeats an ON-OFF operation for each pixel in accordance with image information.

A focal length, etc. in the above configuration are set to be, for example, the values below.

The interval between the electrodes is 3.5 mm, the first focal length of the ellipsoidal mirror is 31.0 mm, the second focal length thereof is 201 mm, a focal length of the collimator lens is 100.0 mm, a focal length of the fly-eye lens is 49.2 mm, a focal length of the relay lens system is 163.2 mm, an image display element is 19.15×14.36 mm, and an aperture at a focal point of the collimator lens is 9.6×12.8 mm.

Figure 4A:
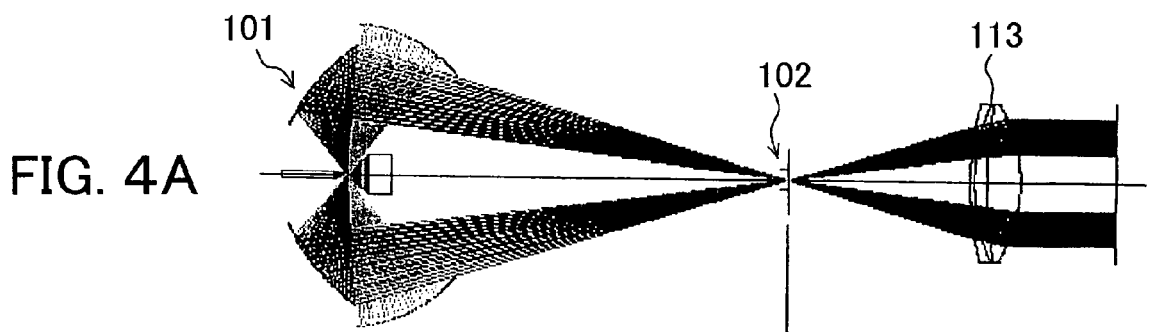
Figure 4B:
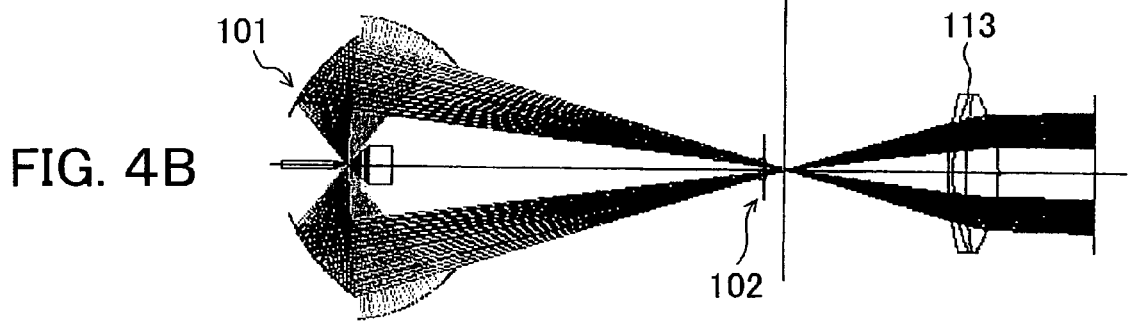

FIG. 4A and FIG. 4B are views showing positional relationships between a focal point of an over reflection mirror and that of a collimator lens, wherein FIG. 4A shows a positional relationship in an apparatus of the related art and FIG. 4B shows a positional relationship according to a first embodiment.

Figure 5A:
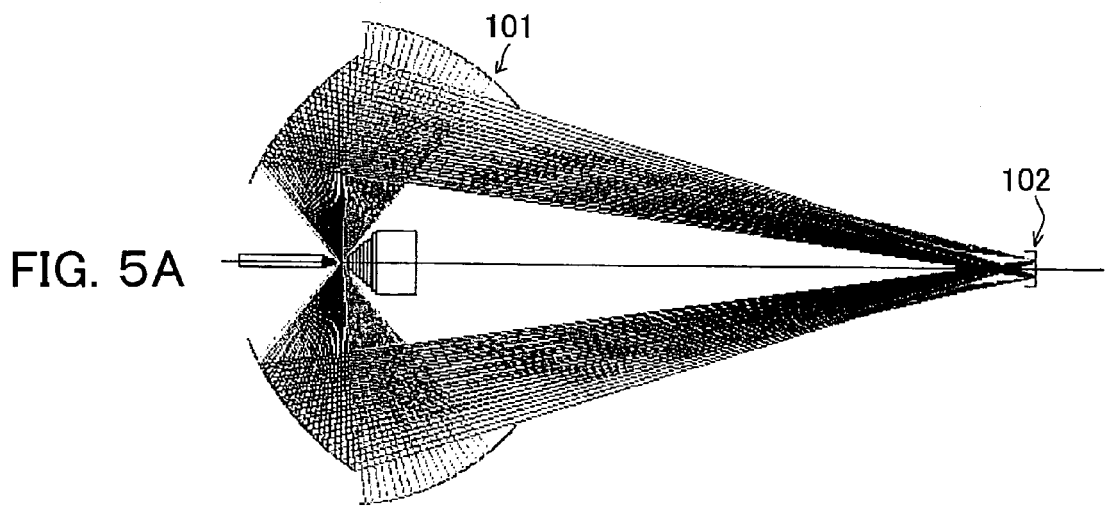
Figure 5B:
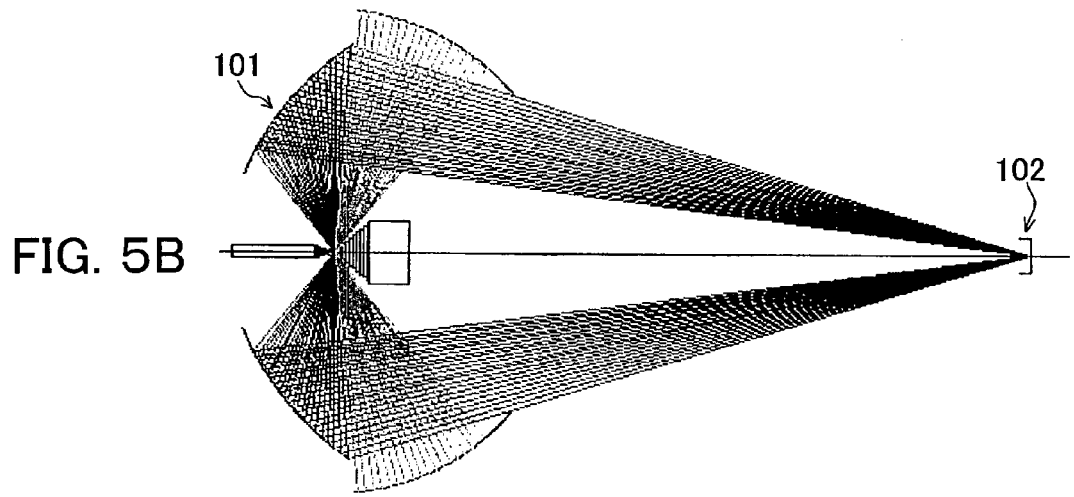
Figure 5C:
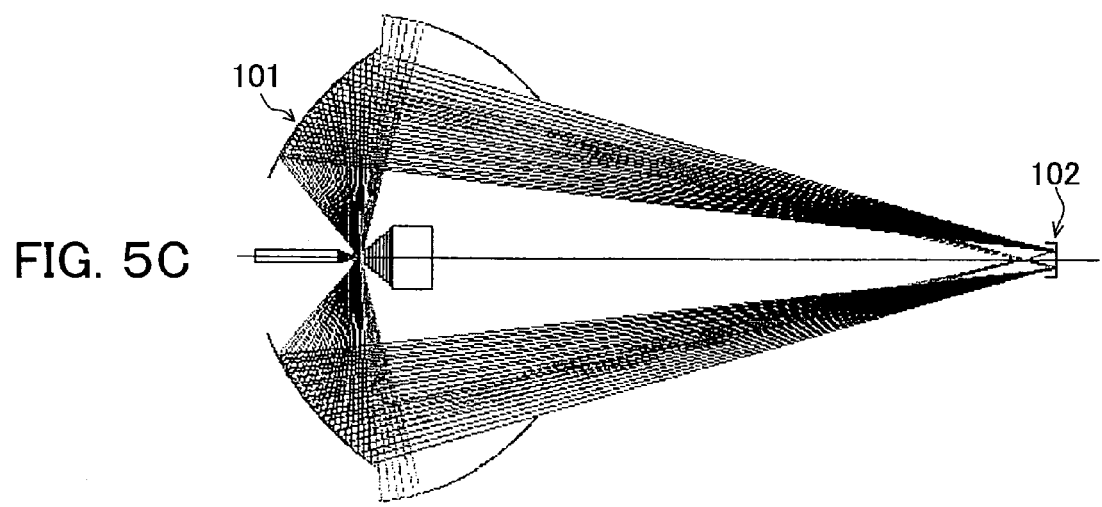

FIG. 5A to FIG. 5C are views showing a relationship between a point source and an ellipsoidal focal point, wherein FIG. 5A is a view of an optical path when the point source is displaced by 0.5 mm from the ellipsoidal focal point to the side of an apex of the reflection mirror, FIG. 5B is a view of an optical path when the point source becomes identical to the ellipsoidal focal point, and FIG. 5C is a view of an optical path when the point source is displaced by 0.5 mm from the ellipsoidal focal point to the side of an opening of the reflection mirror.

Figure 6:
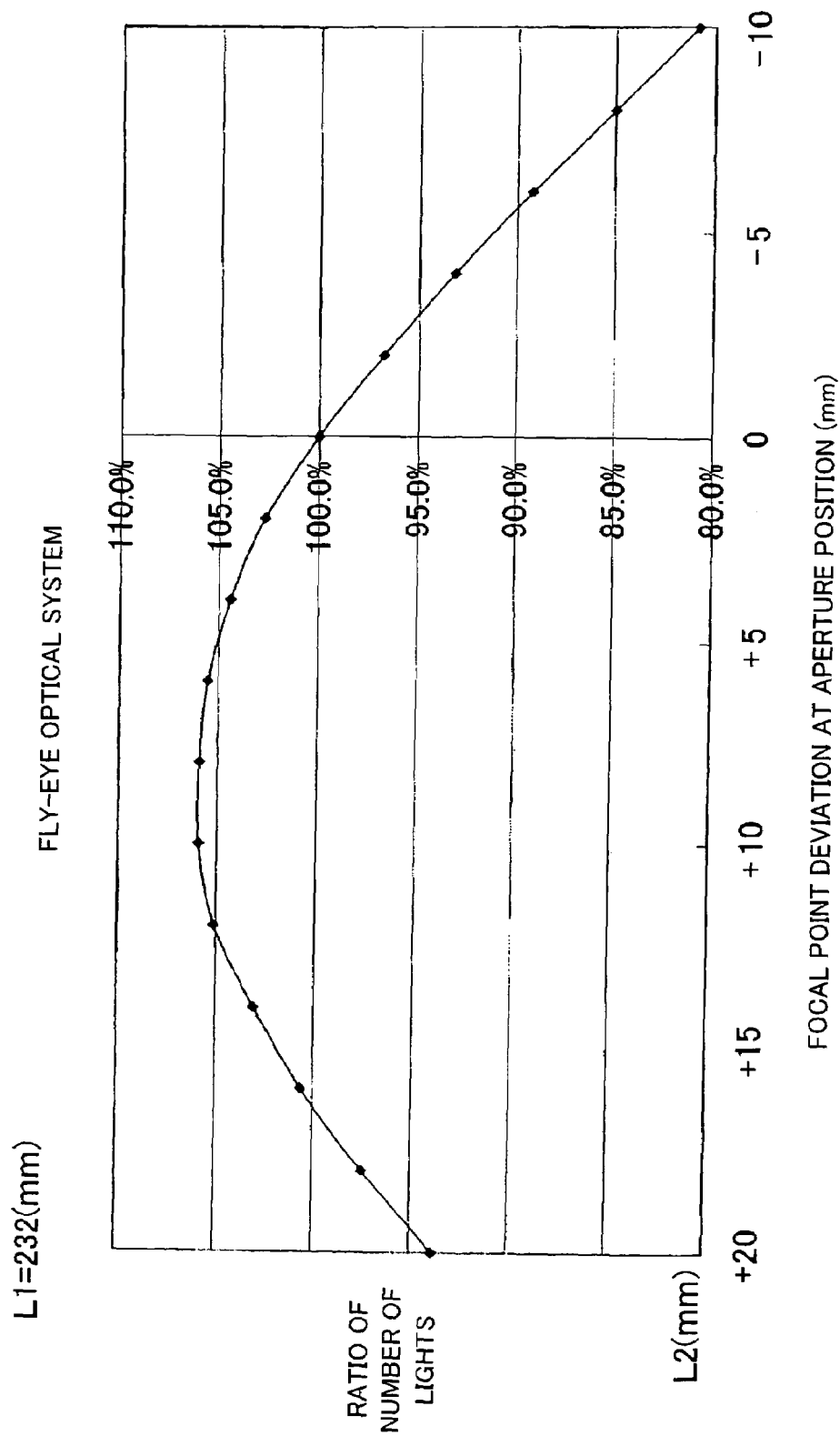
FIG. 6 is a view showing changes of a DMD incident light intensity with respect to an amount of deviation of a stop (aperture) position focal point according to the first embodiment.

FIG. 6 is a view showing changes of the DMD incident light intensity with respect to an amount of deviation of a stop (aperture) position focal point according to the first embodiment.

In the first embodiment, a focal point of the collimator lens is arranged to be shifted by a certain distance from the focal point of the ellipsoidal mirror to the light source side.

When arranging an anode to the reflection mirror opening side and arranging a cathode on the reflection mirror apex side, as shown in FIG. 4A and FIG. 4B, brightness is generally high on the cathode side, so that high-intensity luminous points exist on the reflection mirror apex side.

As shown in FIG. 4B, high-intensity luminous points are made close to the first focal point of the ellipsoidal mirror to improve a light collecting power of the ellipsoidal mirror 101a. In this case, as the arc length becomes longer, the brightness distribution becomes wider on the opening side comparing with that at the first focal point of the ellipsoidal mirror.

As shown in FIG. 5A, a light emitted from a point positioned closer to the opening side than the first focal point of the ellipsoidal mirror exhibits a characteristic of being collected on the light source side than the second focal point due to an aberration of the ellipsoidal mirror.

As a result, as shown in FIG. 5B, although a position that the light emitted from the first focal point of the ellipsoidal mirror converges is the ellipsoidal second focal point, a position with the highest light collecting power is closer to the light source side than the second focal point of the ellipsoidal mirror in the brightness distribution as a whole due to the unevenness of the brightness distribution of the light source.

Note that displacement distances of the maximum light collecting position and the ellipsoidal second focal point vary depending on the degree of unevenness of the brightness distribution of the light source, and the description is omitted in the present invention.

As explained above, a stop is arranged at the second focal point of the ellipsoidal mirror in the related art, while in the first embodiment, the stop 102 is arranged by being displaced by a predetermined distance from the second focal point to the light source side, so that more efficient illumination becomes possible as shown in FIG. 6.

More specifically, in the first embodiment, when the discharging light source of direct current lighting is arranged close to the first focal point of the ellipsoidal mirror, the interval between the electrodes is wide, and the cathode is provided on the mirror opening side; positions of the electrodes with respect to the focal point of the ellipsoidal mirror and a position of the collimator lens is made optimal, and the illumination efficiency is enhanced to the limit.

The first fly-eye lenses 104-1 and 104-2 and the second fly-eye lenses 105-1 and 105-2 have the same focal length due to being formed by the same material, having the same thickness and lens cell surface shape, and maintain the same positional relationship in the first mode and in the second mode due to being arranged at each other's focal points.

Furthermore, as a result that the lens cell aperture shape is made to have an approximately homologous shape of the image display device shape, it is possible to be compatible with an image display device having a different size.

The first lens group 106 (106-1 and 106-2) and the second lens group 108 (108-1 and 108-2) respectively form a relay lens system, and the first lens group 106 (106-1 and 106-2) and the second lens group 108 (108-1 and 108-2) are arranged over the mirror 107 (107-1 and 107-2), respectively.

A focal length of the entire relay lens is equal in the first mode and in the second mode, but the back-focus is different to be in accordance with an optical path length of each prism.

Dotted lines in FIG. 1 indicate that the respective optical elements are arranged in the same way in the first mode and in the second mode.

As shown in FIG. 1, the first fly-eye lens 104 (104-1 and 104-2), the second fly-eye lens 105 (105-1 and 105-2), an incident surface of the first lens group 106 (106-1 and 106-2) of the relay lens system and the mirror 107 (107-1 and 107-2) are arranged in this order from the side of the collimator lens 103 (103-1 and 103-2) on an identical optical axis being free of the influence of reflecting effects.

Also, by making an interval (distance) d1 from the mirror 107-1 to the light incident surface of the second relay lens group 108-1 in the first mode equal to an interval (distance) d2 from the mirror 108-2 to the light incident surface of the second relay lens group 108-2 in the second mode (d1≈d2), it is possible to use a common housing.

Furthermore, by using a lamp having the same light converging angle, the aperture 102 and the collimator lens 103 can be also arrange in the same way as in FIG. 1.

Table 1 below shows an example of specific values of parameters in the condition formulas (1) to (6) explained above in the paraxial arrangement of the first embodiment. This example satisfies the condition formulas.

TABLE 1

PARAXIAL ARRANGEMENT

|  | 1/φ | 1/φ1 | e | 1/φ2 | fb |
|---|---|---|---|---|---|
| STATE 1 | 162.0 | 265.07 | 109.77 | 244.21 | 94.93 |
| STATE 2 | 162.0 | 482.1 | 105.29 | 190.71 | 126.62 | e1/e2 = 1.04,
Fbmax = 162 × 0.9 = 145.8,
Fbmin1 = 57.45,
Fbmin2 = 62.38

As shown in Table 1, the parameters in the first mode (mode 1) are set as below.

An inverse (1/Ø) of a refracting power Ø of the entire relay system is set to 162.0, an inverse (1/Ø11) of a reflective power of the first lens group 106-1 is set to 265.07, a paraxial inter-group distance e1 of the first lens group 106-1 and the second lens group 108-1 is set to 109.77, an inverse (1/Ø12) of a refracting power of the second lens group 108-1 is set to 244.21, and a paraxial back-focus fb1 of the relay lens system with respect to an infinite light flux is set to 94.93, respectively.

Similarly, parameters in the second mode (mode 2) are set as below.

An inverse (1/Ø) of a refracting power Ø of the entire relay system is set to 162.0, an inverse (1/Ø21) of a reflective power of the first lens group 106-2 is set to 482.1, a paraxial inter-group distance e2 of the first lens group 106-2 and the second lens group 108-2 is set to 105.29, an inverse (1/Ø22) of a refracting power of the second lens group 108-2 is set to 190.71, and a paraxial back-focus fb2 of the relay lens system with respect to an infinite light flux is set to 126.62, respectively.

In the projection type display apparatus 100 in the first embodiment, wherein the parameters are set as shown in Table 1, "e1/e2" is 1.04, which is in a range regulated by the condition formula (5), so that the condition is satisfied.

Also, the maximum value Fbmax of the back-focus fb is 145.8 (162×0.9), the minimum value Fbmin1 of the back-focus in the first mode is 57.45 and the minimum value Fbmin2 of the back-focus in the second mode is 62.38, which are in the range regulated by the condition formula (6), so that the condition is satisfied.

Figure 7A:
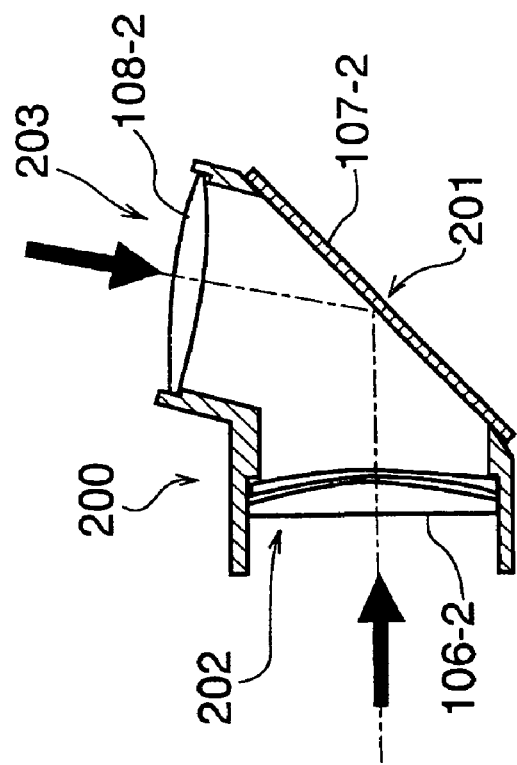
FIG. 7A and FIG. 7B are views of the configuration of a holding member of a relay lens system according to the first embodiment.
Figure 7B:
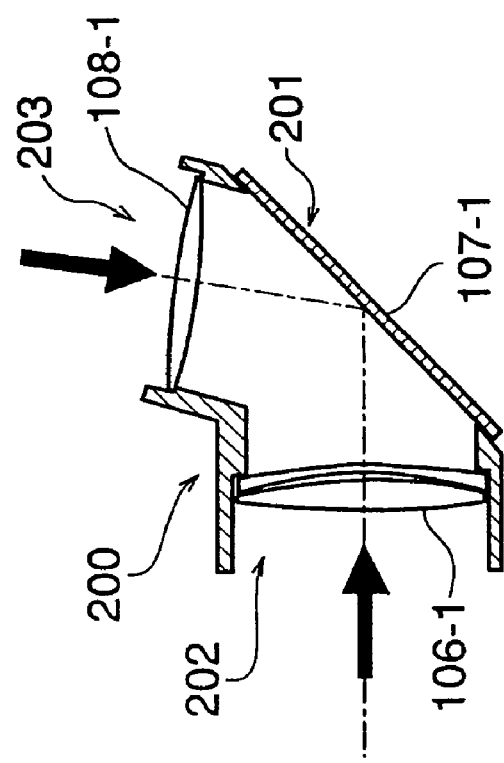

FIG. 7A and FIG. 7B are views of the configuration of a holding member of a relay lens system according to the first embodiment, wherein a section of the cylinder is shown. FIG. 7A corresponds to the first mode and FIG. 7B corresponds to the second mode.

The holding member 200 is formed to be a cylindrical shape bent at a predetermined angle, wherein a bent portion 201 attached with the mirror 107 is cut at a predetermined angle.

It is configured that the mirror 107 is arranged between the first relay lens group 106 and the second relay lens group 108, and the first relay lens group 106 is installed from the fly-eye lens side and the second relay lens group 108 is installed from the TIR prism side, respectively.

Specifically, the first relay lens group 106 is installed in an opening 202 of one end side (fly-eye lens side) and the second relay lens group 108 is installed in an opening 203 on the other end side (TIR prism side) of the bent holding member 200.

Due to the configuration, in the projection type display apparatus 100 according to the first embodiment, a distance from an apex of an emission surface of the first relay lens group 106 to an apex of an incident surface of the second relay lens group 108 is in common, consequently, the relay lens can be installed by using a common housing.

A slight error arises in the height from the lens holding surface to the apex of the surface due to a difference of curvature, however, it can be corrected by a simple spacer. Alternately, it is also possible to design to omit the spacer in consideration of a height of the lens surface.

Figure 8A:
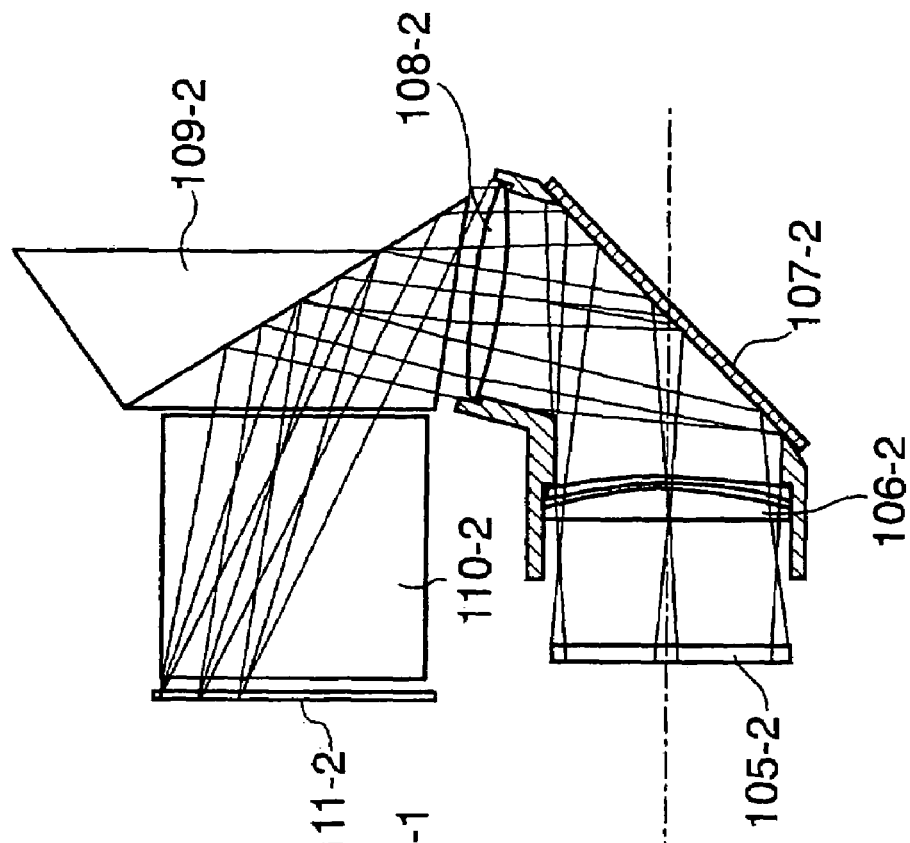
FIG. 8A and FIG. 8B are views of an optical path of a relay lens system in the first mode and that in the second mode according to the first embodiment.
Figure 8B:
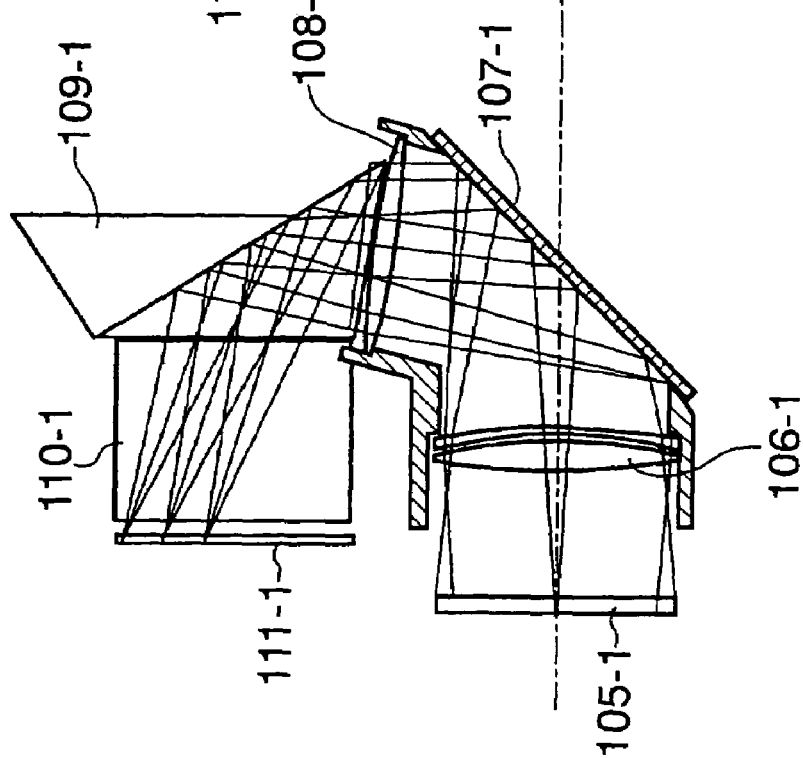

FIG. 8A and FIG. 8B are views of an optical path of a relay lens system in the first mode and in the second mode of the first embodiment.

As is known from the drawings, in the projection type display apparatus 100 of the first embodiment, a parallel light is focused on the image display devices 111-1 and 111-2.

Figure 9A:
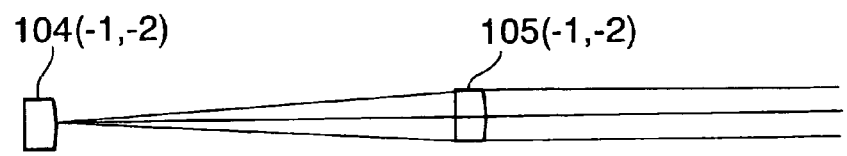
FIG. 9A and FIG. 9B are views showing states of light fluxes when the first fly-eye lens is arranged at a focal point of the second fly-eye lens.
Figure 9B:
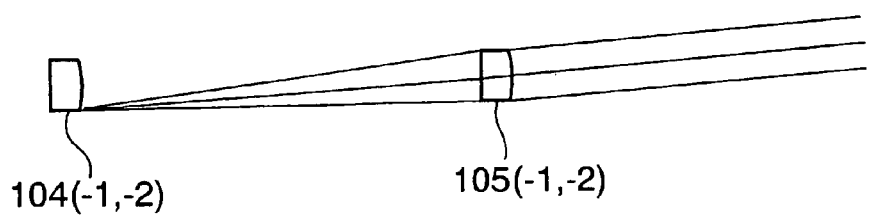

FIG. 9A and FIG. 9B are views showing a state of a light flux when the first fly-eye lens is arranged on a focal point of the second fly-eye lens.

As is known from FIG. 9A and FIG. 9B, in the projection type display apparatus 100 of the first embodiment, the light flux emitted from the surface of the first fly-eye lens becomes parallel as a result that the first fly-eye lenses 104-1 and 104-2 are arranged on the focal points of the second fly-eye lenses 105-1 and 105-2.

Figure 10A:
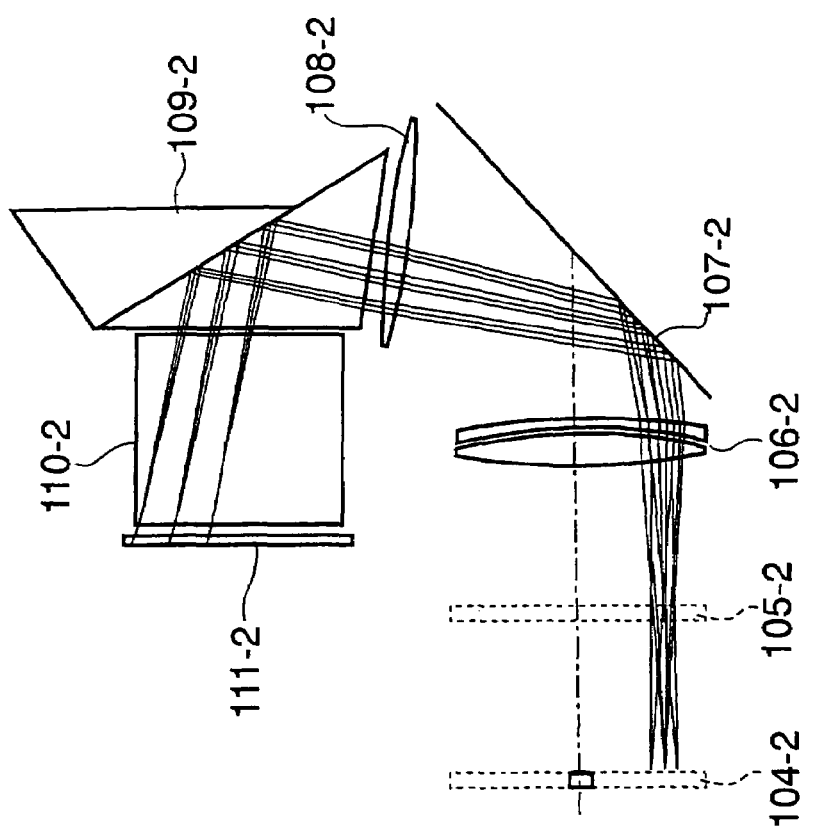
FIG. 10A and FIG. 10B are views obtained by putting FIG. 8A and FIG. 9A together and FIG. 8B and FIG. 9B together.
Figure 10B:
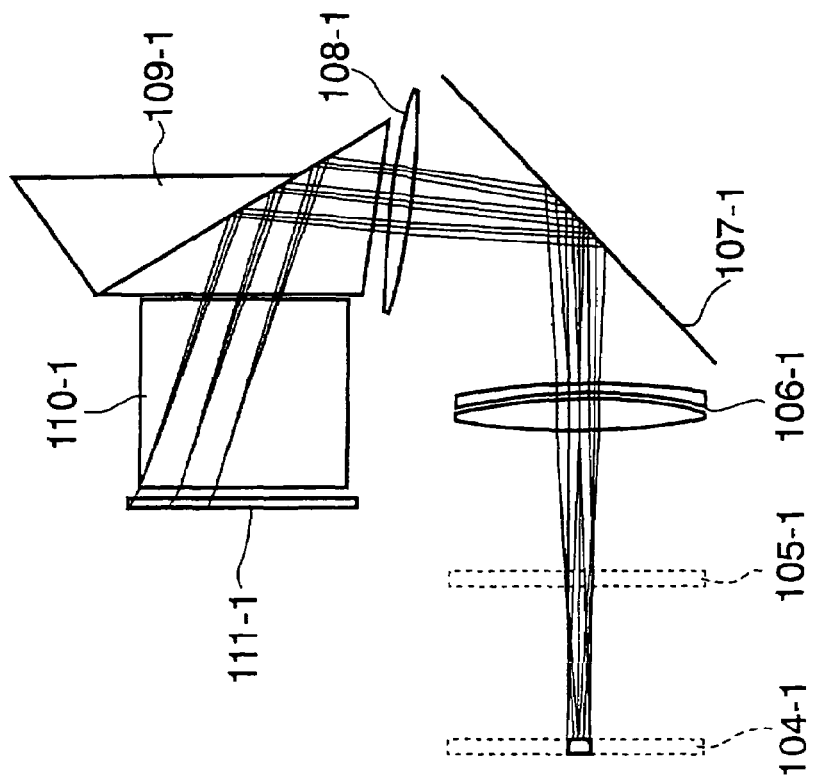

FIG. 10A and FIG. 10B are views, wherein FIG. 7A and FIG. 7B are put together with FIG. 8A and FIG. 8B and a state that a surface of the first fly-eye lens is focused on the image display devices 111-1 and 111-2 by the second fly-eye lens and the relay lens is shown by focusing on the lens cell at the center and the peripheral lens cells.

Figure 11:
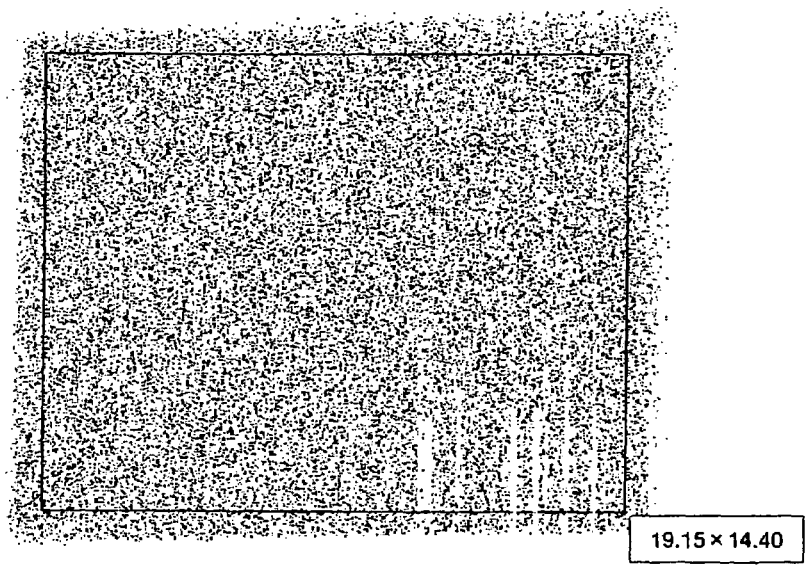
FIG. 11 is a view showing an illumination state of an image display device on an optical path in the first mode according to the first embodiment.

FIG. 11 is a view of an illumination state of an image display device in an optical path in the first mode of the first embodiment.

Figure 12:
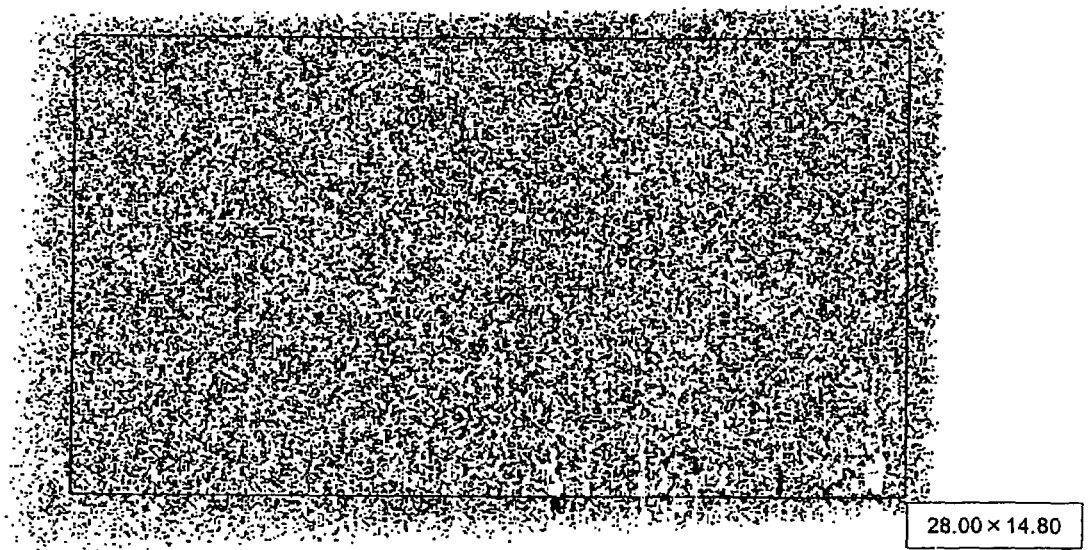
FIG. 12 is a view showing an illumination state of an image display device on an optical path in the second mode according to the first embodiment.

FIG. 12 is a view of an illumination state of an image display device in an optical path in the second mode of the first embodiment.

From FIG. 11 and FIG. 12, in the projection type display apparatus 100 of the first embodiment, it is known that image display devices having different sizes are accurately illuminated by using the common housing.

Table 2 shows optical data in the first mode in the first embodiment and Table 3 shows optical data in the second mode in the same way.

As shown in Table 2 and Table 3, the projection type display apparatus 100 of the first embodiment accepts image display devices having different sizes as a result of having the same fly-eye lens arrangement and changing a size of the lens cell.

TABLE 2

| SURFACE | R | INTERVAL | REFRACTION INDEX | DISPERSION | INCLINATION | EFFECTIVE DIAMETER | |
|---|---|---|---|---|---|---|---|
| 1 | ∞ | 83.60 | | | | 10.0 × 18.2 | |
| 2 | 135.34 | 2.00 | 1.60311 | 60.7 | | φ70 | |
| 3 | 85.61 | 5.80 | | | | φ70 | |
| 4 | 205.25 | 15.00 | 1.63854 | 55.4 | | φ70 | |
| 5 | −68.49 | 30.00 | | | | φ70 | |
| 6 | ∞ | 3.50 | 1.472 | 65.65 | | 70.5 × 68.2 | |
| 7 | −23.3 | 46.0 | | | | 4.7 × 6.2 | FLY-EYE CELL SIZE |
| 8 | ∞ | 3.50 | 1.472 | 65.65 | | 70.5 × 68.2 | |
| 9 | −23.3 | 40.00 | | | | 4.7 × 6.2 | FLY-EYE CELL SIZE |
| 10 | 200.00 | 10.00 | 1.51633 | 64.1 | | φ70 | |
| 11 | −137.40 | 2.00 | | | | φ70 | |
| 12 | −120.00 | 2.00 | 1.80518 | 25.4 | | φ70 | |
| 13 | −195.00 | 51.00 | | | | φ70 | |
| 14 | ∞ | 49.00 | REFLECTION SURFACE | | 48.625 | | |
| 15 | 252.00 | 6.00 | 1.51633 | 64.1 | | φ70 | |
| 16 | −252.00 | 4.00 | | | | φ70 | |
| 17 | ∞ | 27.84 | 1.51633 | 64.1 | | | |
| 18 | ∞ | 35.46 | REFLECTION SURFACE | | 49.75 | | |
| 19 | ∞ | 1.00 | | | 16.75 | | |
| 20 | ∞ | 57.00 | 1.51633 | 64.1 | | | |
| 21 | ∞ | 4.00 | | | | | |
| 22 | ∞ | 3.00 | 1.51633 | 64.1 | | | |
| 23 | ∞ | 0.50 | | | | 19.15 × 14.36 | IMAGE DISPLAY DEVICE |

TABLE 3

| SURFACE | R | INTERVAL | REFRACTION INDEX | DISPERSION | INCLINATION | EFFECTIVE DIAMETER | |
|---|---|---|---|---|---|---|---|
| 1 | ∞ | 83.60 | | | | 10.0 × 18.2 | |
| 2 | 135.34 | 2.00 | 1.60311 | 60.7 | | φ70 | |
| 3 | 85.61 | 5.80 | | | | φ70 | |
| 4 | 205.25 | 15.00 | 1.63854 | 55.4 | | φ70 | |
| 5 | −68.49 | 30.00 | | | | φ70 | |
| 6 | ∞ | 3.50 | 1.472 | 65.65 | | 72 × 71.2 | |
| 7 | −23.3 | 46.0 | | | | 4.8 × 8.9 | FLY-EYE SURFACE |

TABLE 3-continued

| SURFACE | R | INTERVAL | REFRACTION INDEX | DISPERSION | INCLINATION | EFFECTIVE DIAMETER | |
|---|---|---|---|---|---|---|---|
| 8 | ∞ | 3.50 | 1.472 | 65.65 | | 72 × 71.2 | |
| 9 | −23.3 | 40.00 | | | | 4.8 × 8.9 | FLY-EYE SURFACE |
| 10 | ∞ | 10.00 | 1.51633 | 64.1 | | φ70 | |
| 11 | −99.12 | 2.00 | | | | φ70 | |
| 12 | −88.00 | 2.00 | 1.80518 | 25.4 | | φ70 | |
| 13 | −135.00 | 51.00 | | | | φ70 | |
| 14 | ∞ | 49.00 | REFLECTION SURFACE | | 48.625 | | |
| 15 | 174.60 | 8.00 | 1.51633 | 64.1 | | φ70 | |
| 16 | −224.00 | 6.30 | | | | φ70 | |
| 17 | ∞ | 35.2 | 1.51633 | 64.1 | | | |
| 18 | ∞ | 46.2 | REFLECTION SURFACE | | 49.75 | | |
| 19 | ∞ | 1.00 | | | 16.75 | | |
| 20 | ∞ | 82.50 | 1.51633 | 64.1 | | | |
| 21 | ∞ | 4.00 | | | | | |
| 22 | ∞ | 3.00 | 1.51633 | 64.1 | | | |
| 23 | ∞ | 0.50 | | | | 28.02 × 14.77 | IMAGE DISPLAY DEVICE |

Second Embodiment

Figures 13A, 13B:
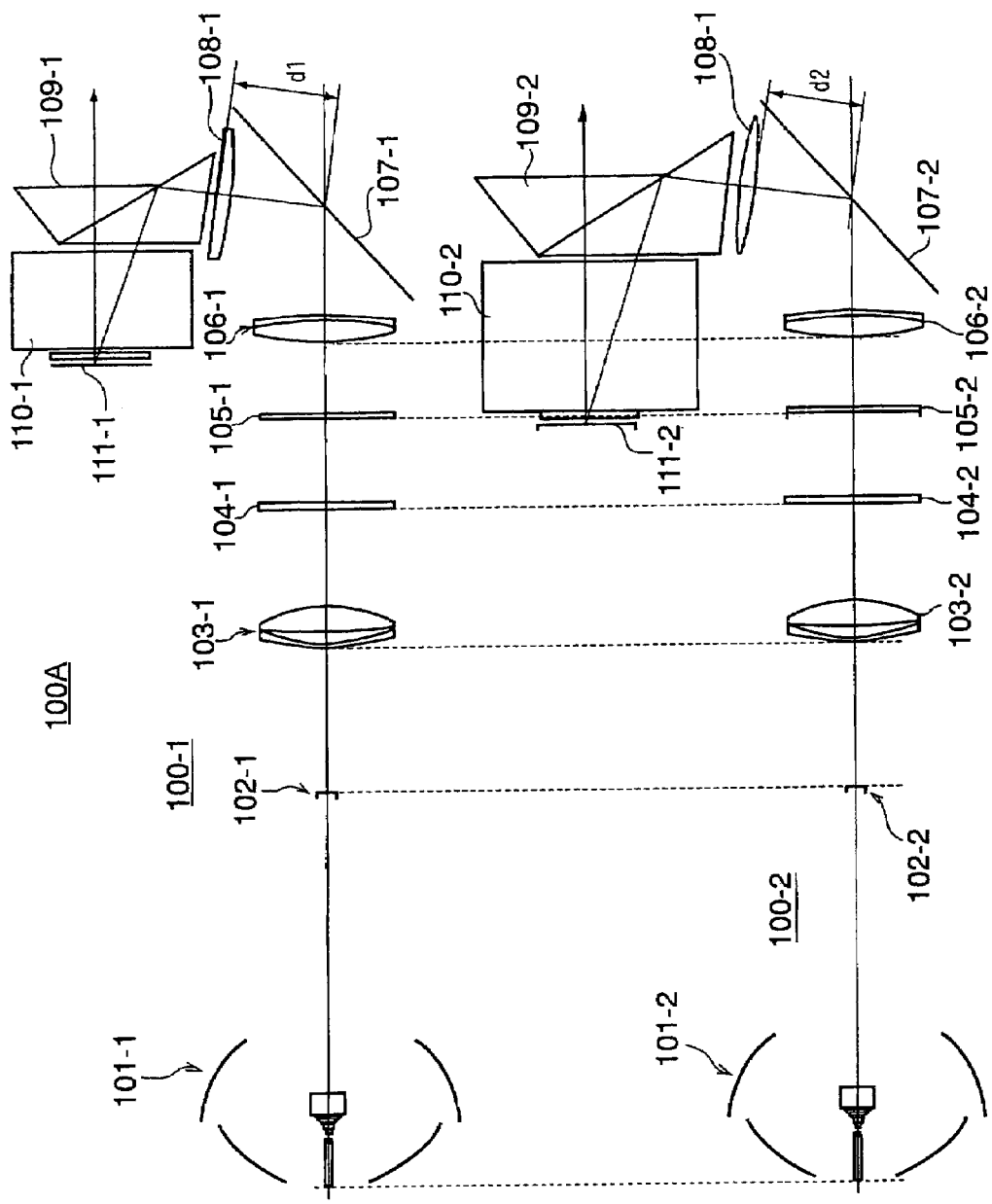
FIG. 13A and FIG. 13B are views of an optical system showing the configuration in a first mode and that in a second mode of a projection type display apparatus according to a second embodiment of the present invention.

FIG. 13A and FIG. 13B are views of an optical system showing the configuration in a first mode and that in a second mode of a projection type display apparatus according to a second embodiment of the present invention; wherein FIG. 13A shows the configuration in the first mode, and FIG. 13B shows the configuration in the second mode, respectively.

The projection type display apparatus 100A of the second embodiment basically has the same configuration as that of the projection type display apparatus 100 in the first embodiment.

A point that the projection type display apparatus 100A of the second embodiment is different from that of the first embodiment is a focal length of the relay lens and a distance between lens groups, this embodiment indicates that the housing can be used in common in ranges of satisfying the condition formulas (1) to (6).

Table 4 below shows an example of specific values of parameters in the condition formulas (1) to (6) of a paraxial arrangement of the second embodiment. This example satisfies the condition formulas.

TABLE 4

| | 1/φ | 1/φ1 | e | 1/φ2 | fb |
|---|---|---|---|---|---|
| STATE 1 | 200.0 | 234.23 | 117.67 | 682.40 | 93.00 |
| STATE 2 | 200.0 | 342.47 | 120.58 | 311.37 | 126.6 | e1/e2 = 0.976
Fbmax = 200 × 0.9 = 180
Fbmin1 = 90.56,
Fbmin2 = 87.36

As shown in Table 4, the parameters in the first mode (mode 1) are set as below.

An inverse (1/Ø) of a refracting power Ø of the entire relay system is set to 200.0, an inverse (1/Ø11) of a reflective power of the first lens group 106-1 is set to 234.23, a paraxial inter-group distance e1 of the first lens group 106-1 and the second lens group 108-1 is set to 117.67, an inverse (1/Ø12) of a refracting power of the second lens group 108-1 is set to 682.40, and a paraxial back-focus fb1 of the relay lens system with respect to an infinite light flux is set to 93.00, respectively.

Similarly, parameters in the second mode (mode 2) are set as below.

An inverse (1/Ø) of a refracting power Ø of the entire relay system is set to 200.0, an inverse (1/Ø21) of a reflective power of the first lens group 106-2 is set to 342.47, a paraxial inter-group distance e2 of the first lens group 106-2 and the second lens group 108-2 is set to 120.58, an inverse (1/Ø22) of a refracting power of the second lens group 108-2 is set to 311.37, and a paraxial back-focus fb2 of the relay lens system with respect to an infinite light flux is set to 126.6, respectively.

In the projection type display apparatus 100A in the second embodiment, wherein the parameters are set as in Table 4, "e1/e2" is 0.976, which is in a range regulated by the condition formula (5), so that the condition is satisfied.

Also, the maximum value Fbmax of the back-focus fb is 180 (200×0.9), the minimum value Fbmin1 of the back-focus in the first mode is 90.56 and the minimum value Fbmin2 of the back-focus in the second mode is 87.36, which are in the range regulated by the condition formula (6), so that the condition is satisfied.

Table 5 shows optical data in the first mode of the second embodiment, and Table 6 shows optical data in the second mode in the same way.

As shown in Table 5 and Table 6, the projection type display apparatus 100A of the second embodiment accepts image display devices having different sizes as a result of having the same fly-eye lens arrangement and changing a size of the lens cell.

TABLE 5

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |

TABLE 5-continued

| SURFACE | R | INTERVAL | REFRACTION INDEX | DISPERSION | INCLINATION | EFFECTIVE DIAMETER |
|---|---|---|---|---|---|---|
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 68.4 × 70.0 |
| 7 | −23.3 | 46.0 | | | | 3.8 × 5.0 |
| 8 | ∞ | 3.50 | 1.472 | 65.65 | | 68.4 × 70.0 |
| 9 | −23.3 | 40.00 | | | | 3.8 × 5.0 |
| 10 | 141.50 | 12.40 | 1.51633 | 64.1 | | φ74 |
| 11 | −152.00 | 0.80 | | | | φ74 |
| 12 | −139.20 | 2.50 | 1.80518 | 25.4 | | φ74 |
| 13 | −267.00 | 61.00 | | | | φ74 |
| 14 | ∞ | 49.00 | REFLECTION SURFACE | | 48.625 | |
| 15 | 290.00 | 7.40 | 1.51633 | 64.1 | | φ62 |
| 16 | 1600.00 | 4.00 | | | | φ62 |
| 17 | ∞ | 27.84 | 1.51633 | 64.1 | | |
| 18 | ∞ | 35.46 | REFLECTION SURFACE | | 49.75 | |
| 19 | ∞ | 1.00 | | | 16.75 | |
| 20 | ∞ | 57.00 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 19.15 × 14.36 |

TABLE 6

| SURFACE | R | INTERVAL | REFRACTION INDEX | DISPERSION | INCLINATION | EFFECTIVE DIAMETER |
|---|---|---|---|---|---|---|
| 1 | ∞ | 83.60 | | | | 10.0 × 18.2 |
| 2 | 135.34 | 2.00 | 1.60311 | 60.7 | | φ70 |
| 3 | 85.61 | 5.80 | | | | φ70 |
| 4 | 205.25 | 15.00 | 1.63854 | 55.4 | | φ70 |
| 5 | −68.49 | 30.00 | | | | φ70 |
| 6 | ∞ | 3.50 | 1.472 | 65.65 | | 71 × 70.2 |
| 7 | −23.3 | 46.0 | | | | 7.1 × 3.9 |
| 8 | ∞ | 3.50 | 1.472 | 65.65 | | 71 × 70.2 |
| 9 | −23.3 | 40.00 | | | | 7.1 × 3.9 |
| 10 | 215.00 | 12.40 | 1.51633 | 64.1 | | φ70 |
| 11 | −164.60 | 0.80 | | | | φ70 |
| 12 | −147.70 | 2.50 | 1.80518 | 25.4 | | φ70 |
| 13 | −284.00 | 61.00 | | | | φ70 |
| 14 | ∞ | 49.00 | REFLECTION SURFACE | | 48.625 | |
| 15 | 300.00 | 7.40 | 1.51633 | 64.1 | | φ70 |
| 16 | −346.00 | 6.30 | | | | φ70 |
| 17 | ∞ | 35.2 | 1.51633 | 64.1 | | |
| 18 | ∞ | 46.2 | REFLECTION SURFACE | | 49.75 | |
| 19 | ∞ | 1.00 | | | 16.75 | |
| 20 | ∞ | 82.50 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 28.02 × 14.77 |

Figure 14:
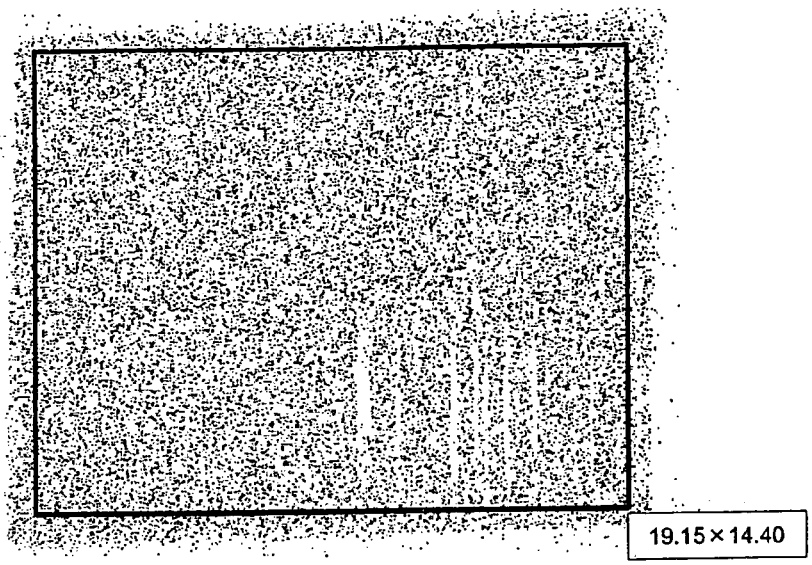
FIG. 14 is a view showing an illumination state of an image display device on an optical path in the first mode according to the second embodiment.

FIG. 14 is a view of an illumination state of an image display device in an optical path in the first mode of the second embodiment.

Figure 15:
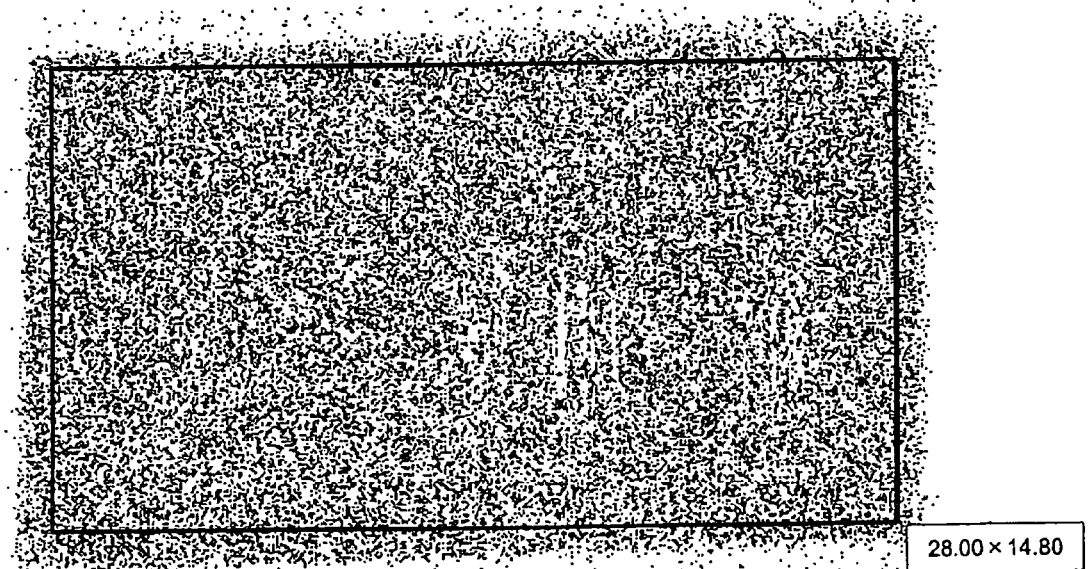
FIG. 15 is a view showing an illumination state of an image display device on an optical path in the second mode according to the second embodiment.

FIG. 15 is a view of an illumination state of an image display device in an optical path in the second mode of the second embodiment.

From FIG. 14 and FIG. 15, it is known that ranges of image display devices having different sizes are illuminated uniformly (accurately by using a same housing) in the projection type display apparatus 100A of the second embodiment.

Third Embodiment

Figures 16A, 16B:
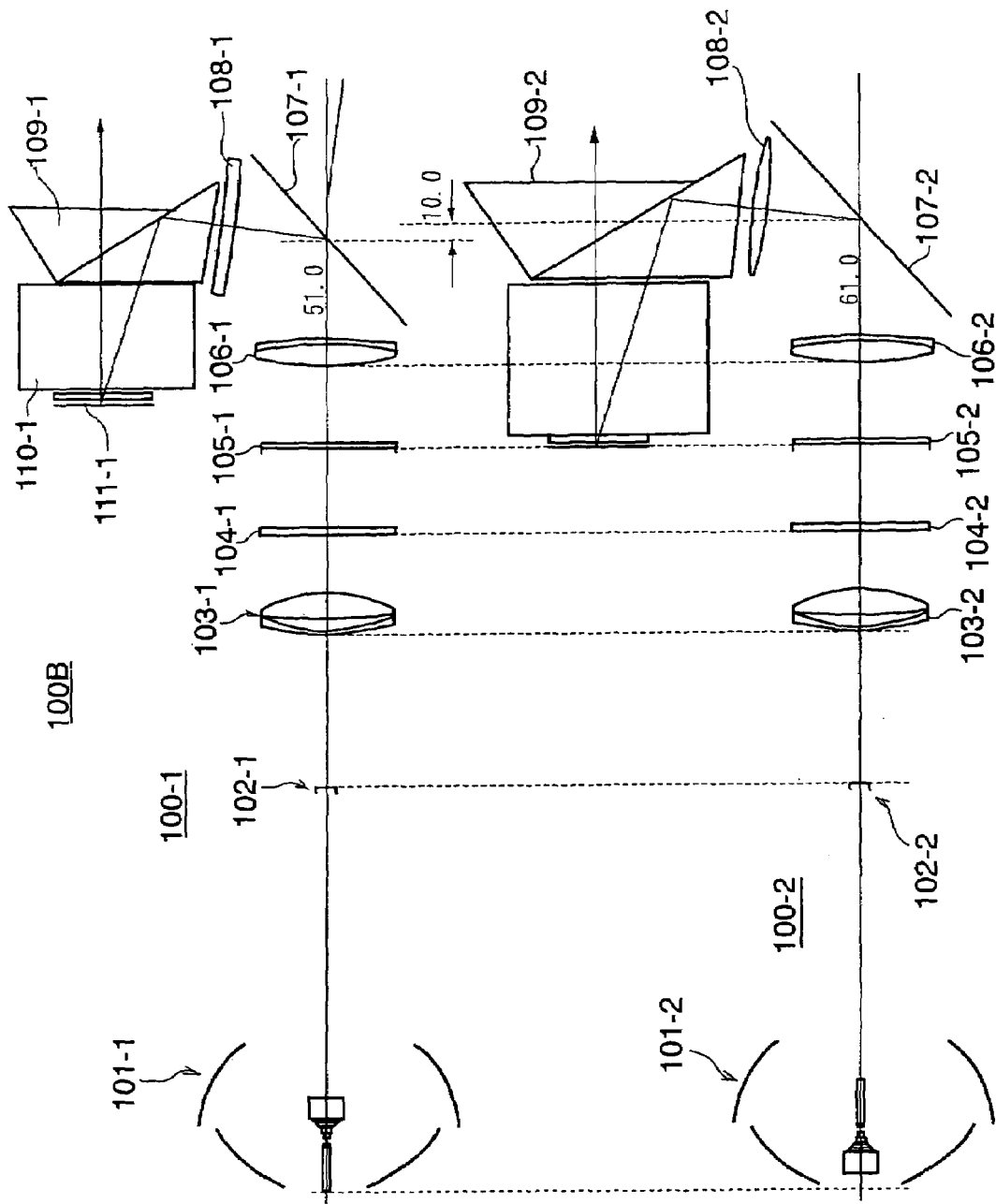
FIG. 16A and FIG. 16B are views of an optical system showing the configuration in a first mode and that in a second mode of a projection type display apparatus according to a third embodiment of the present invention.

FIG. 16A and FIG. 16B are views of an optical system showing the configuration in a first mode and that in a second mode of a projection type display apparatus according to a third embodiment of the present invention; wherein FIG. 16A shows the configuration in the first mode and FIG. 16B shows the configuration in the second mode, respectively.

The projection type display apparatus 100B of the third embodiment basically has the same configuration as those of the projection type display apparatuses 100 and 100A in the first embodiment and the second embodiment.

A point that the projection type display apparatus 100B of the third embodiment is different from those in the first and second embodiments is that the condition formula (5) as explained above is not satisfied and a common housing cannot be used, and it is a comparative example of the first and second embodiments.

Table 7 below shows an example of specific values of parameters in the condition formulas (1) to (6) of a paraxial arrangement of the third embodiment. This is an example of not satisfying the condition formulas.

TABLE 7

|  | $1/\phi$ | $1/\phi1$ | e | $1/\phi2$ | fb |
|---|---|---|---|---|---|
| STATE 1 | 200.0 | 215.17 | 103.18 | 1469.93 | 93.0 |
| STATE 2 | 200.0 | 342.47 | 120.58 | 311.37 | 126.6 | e1/e2 = 0.856 < 0.95
f × 0.9 = 180.0
1.1 × (1 − e1 × φ1)/φ1 = 106.5 > fb93
1.1 × (1 − e2 × φ2)/φ2 = 87.36 < fb126.62
x LOWER LIMIT VALUE
o

As shown in Table 7, parameters in the first mode (mode 1) are set as below.

An inverse (1/Ø) of a refracting power Ø of the entire relay system is set to 200.0, an inverse (1/Ø11) of a reflective power of the first lens group 106-1 is set to 215.17, a paraxial inter-group distance e1 of the first lens group 106-1 and the second lens group 108-1 is set to 103.18, an inverse (1/Ø12) of a refracting power of the second lens group 108-1 is set to 1469.93, and a paraxial back-focus fb1 of the relay lens system with respect to an infinite light flux is set to 93.00, respectively.

Similarly, parameters in the second mode (mode 2) are set as below.

An inverse (1/Ø) of a refracting power Ø of the entire relay system is set to 200.0, an inverse (1/Ø21) of a reflective power of the first lens group 106-2 is set to 342.47, a paraxial inter-group distance e2 of the first lens group 106-2 and the second lens group 108-2 is set to 120.58, an inverse (1/Ø22) of a refracting power of the second lens group 108-2 is set to 311.37, and a paraxial back-focus fb2 of the relay lens system with respect to an infinite light flux is set to 126.6, respectively.

In the projection type display apparatus 100B in the third embodiment, wherein the parameters are set as shown in Table 7, "e1/e2" is 0.856, which is smaller than the lower limit value regulated by the condition formula (5), so that the condition formula (5) is not satisfied.

Also, the maximum value Fbmax of the back-focus fb is 180 (200×0.9), the minimum value Fbmin1 of the back-focus in the first mode is 106.5 and the minimum value Fbmin2 of the back-focus in the second mode is 87.36, which do not satisfy the range regulated by the condition formula (6).

Table 8 shows optical data in the first mode of the third embodiment, and Table 9 shows optical data in the second mode in the same way.

TABLE 8

| SURFACE | R | INTERVAL | REFRACTION INDEX | DISPERSION | INCLINATION | EFFECTIVE DIAMETER |
|---|---|---|---|---|---|---|
| 1 | ∞ | 83.60 |  |  |  | 10.0 × 18.2 |
| 2 | 135.34 | 2.00 | 1.60311 | 60.7 |  | φ70 |
| 3 | 85.61 | 5.80 |  |  |  | φ70 |
| 4 | 205.25 | 15.00 | 1.63854 | 55.4 |  | φ70 |
| 5 | −68.49 | 30.00 |  |  |  | φ70 |
| 6 | ∞ | 3.50 | 1.472 | 65.65 |  | 68.4 × 70.0 |
| 7 | −23.3 | 46.0 |  |  |  | 3.8 × 5.0 |
| 8 | ∞ | 3.50 | 1.472 | 65.65 |  | 68.4 × 70.0 |
| 9 | −23.3 | 40.00 |  |  |  | 3.8 × 5.0 |
| 10 | 131.30 | 12.40 | 1.51633 | 64.1 |  | φ74 |
| 11 | −144.80 | 0.80 |  |  |  | φ74 |
| 12 | −132.30 | 2.50 | 1.80518 | 25.4 |  | φ74 |
| 13 | −248.00 | 51.00 |  |  |  | φ74 |
| 14 | ∞ | 49.00 | REFLECTION SURFACE |  | 48.625 |  |
| 15 | 360.00 | 7.40 | 1.51633 | 64.1 |  | φ62 |
| 16 | 678.00 | 4.00 |  |  |  | φ62 |
| 17 | ∞ | 27.84 | 1.51633 | 64.1 |  |  |
| 18 | ∞ | 35.46 | REFLECTION SURFACE |  | 49.75 |  |
| 19 | ∞ | 1.00 |  |  | 16.75 |  |
| 20 | ∞ | 57.00 | 1.51633 | 64.1 |  |  |
| 21 | ∞ | 4.00 |  |  |  |  |
| 22 | ∞ | 3.00 | 1.51633 | 64.1 |  |  |
| 23 | ∞ | 0.50 |  |  |  | 19.15 × 14.36 |

TABLE 9

| SURFACE | R | INTERVAL | REFRACTION INDEX | DISPERSION | INCLINATION | EFFECTIVE DIAMETER |
|---|---|---|---|---|---|---|
| 1 | ∞ | 83.60 |  |  |  | 10.0 × 18.2 |
| 2 | 135.34 | 2.00 | 1.60311 | 60.7 |  | φ70 |
| 3 | 85.61 | 5.80 |  |  |  | φ70 |
| 4 | 205.25 | 15.00 | 1.63854 | 55.4 |  | φ70 |
| 5 | −68.49 | 30.00 |  |  |  | φ70 |
| 6 | ∞ | 3.50 | 1.472 | 65.65 |  | 71 × 70.2 |
| 7 | −23.3 | 46.0 |  |  |  | 7.1 × 3.9 |
| 8 | ∞ | 3.50 | 1.472 | 65.65 |  | 71 × 70.2 |

TABLE 9-continued

| SURFACE | R | INTERVAL | REFRACTION INDEX | DISPERSION | INCLINATION | EFFECTIVE DIAMETER |
|---|---|---|---|---|---|---|
| 9 | −23.3 | 40.00 | | | | 7.1 × 3.9 |
| 10 | 215.00 | 12.40 | 1.51633 | 64.1 | | ϕ70 |
| 11 | −164.60 | 0.80 | | | | ϕ70 |
| 12 | −147.70 | 2.50 | 1.80518 | 25.4 | | ϕ70 |
| 13 | −284.00 | 61.00 | | | | ϕ70 |
| 14 | ∞ | 49.00 | REFLECTION SURFACE | | 48.625 | |
| 15 | 300.00 | 7.40 | 1.51633 | 64.1 | | ϕ70 |
| 16 | −346.00 | 6.30 | | | | ϕ70 |
| 17 | ∞ | 35.2 | 1.51633 | 64.1 | | |
| 18 | ∞ | 46.2 | REFLECTION SURFACE | | 49.75 | |
| 19 | ∞ | 1.00 | | | 16.75 | |
| 20 | ∞ | 82.50 | 1.51633 | 64.1 | | |
| 21 | ∞ | 4.00 | | | | |
| 22 | ∞ | 3.00 | 1.51633 | 64.1 | | |
| 23 | ∞ | 0.50 | | | | 28.02 × 14.77 |

As explained above, the projection type display apparatus 100B of the third embodiment is an example of being in short of the lower limit value of the condition formula (5), and it is known that an interval between the first lens group 106 and the second lens group 108 is changed by 10 mm. In this case, a common housing cannot be used.

Fourth Embodiment

As a fourth embodiment, a change of a value in the condition formula (6) when designing the relay lens system by changing the back-focus while keeping an interval between lens apexes to be constant will be examined.

Figures 17A, 17B, 17C:
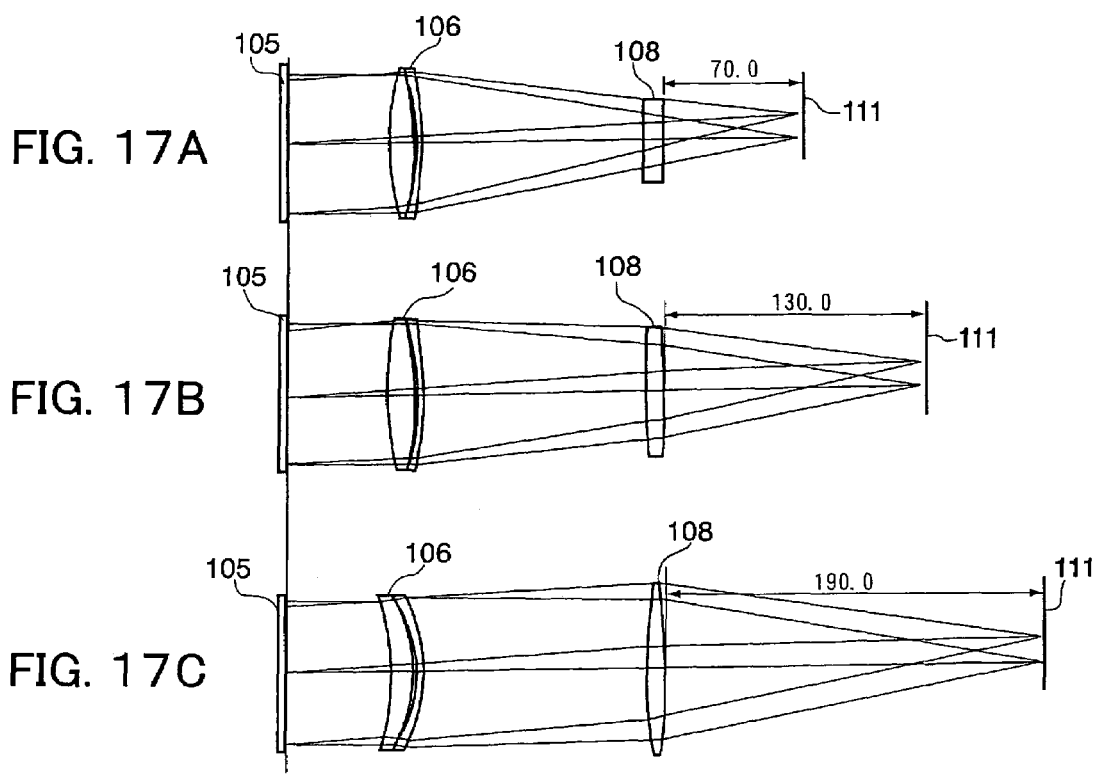
FIG. 17A to FIG. 17C are view of optical paths when changing a back-focus while keeping a constant arrangement with a focal length of 200 mm.

FIG. 17A to FIG. 17C are views of an optical path when changing a back focus while keeping an arrangement constant at a focal length of 200 mm. In FIG. 17A to FIG. 17C, bending by a mirror is omitted and a prism optical path is illustrated in terms of air.

In this case, as shown in FIG. 17A, when the back-focus is made shorter with respect to the focal length, a refracting power of the second lens group 108 becomes weak and the refracting power leans to the first lens group 106. Since a refracting power gathers to the first lens group 106 being close to a stop, field curvature arises and rectangular boundary lines of an illumination area defocuses, which is not preferable.

Inversely, as shown in FIG. 17C, when the back-focus becomes close to the focal length, a refracting power gathers to the second lens group 108. In this case, since a refracting power of the first lens group 106 being close to the stop is weak, a spherical aberration arises, the illumination area boundary lines blur as a whole and the width becomes wide, which is not preferable. It is because a wider illumination area becomes necessary to secure an effective area in the case where the blur spreads wide comparing with that in the case where the boundary lines are sharp.

The power arrangements in FIG. 17A to FIG. 17C are shown in Table 10. Values of a back-focus condition formula are also shown.

In Table 10, "a" corresponds to FIG. 17A, "b" corresponds to FIG. 17B, and "c" corresponds to FIG. 17C.

As shown in Table 10, "a" and "c" do not satisfy the condition formula.

TABLE 10

| | f | Fb | 1/ϕ1 | 1/ϕ2 | e | e1/e2 | (1 − ϕe)/ϕ × 1.1 | f × 0.9 |
|---|---|---|---|---|---|---|---|---|
| a | 200.0 | 70 | 193.14 | −2427.83 | 109.705 | 0.93 | 99.32 | 180 |
| b | 200.0 | 130 | 362.18 | 297.75 | 117.89 | STANDARD | 90.32 | 180 |
| C | 200.0 | 190 | 1572.33 | 223.65 | 38.42 | 0.325 | 177.74 | 180 |

Table 11 shows optical data of the configuration in FIG. 17A. Table 12 shows optical data of the configuration in FIG. 17B and Table 13 shows optical data of the configuration in FIG. 17C in the same way.

TABLE 11

| SUR-FACE | R | IN-TERVAL | RE-FRACTION INDEX | DIS-PERSION | EFFECTIVE DIAMETER |
|---|---|---|---|---|---|
| STOP | | 40.0 | | | ϕ68 |
| 1 | 120.1237 | 12.40 | 1.51633 | 64.1 | ϕ70 |
| 2 | −134.6766 | 0.80 | | | ϕ70 |
| 3 | −122.3330 | 2.50 | 1.80518 | 25.4 | ϕ70 |
| 4 | −220.8936 | 110.00 | | | ϕ70 |
| 5 | −537.1323 | 10.0 | 1.51633 | 64.1 | ϕ70 |
| 6 | −943.4605 | 70.0 | | | ϕ70 |

TABLE 12

| SUR-FACE | R | IN-TERVAL | RE-FRACTION INDEX | DIS-PERSION | EFFECTIVE DIAMETER |
|---|---|---|---|---|---|
| STOP | | 40.0 | | | ϕ68 |
| 1 | 261.2074 | 12.40 | 1.51633 | 64.1 | ϕ70 |
| 2 | −152.7759 | 0.80 | | | ϕ70 |

TABLE 12-continued

| SURFACE | R | INTERVAL | REFRACTION INDEX | DISPERSION | EFFECTIVE DIAMETER |
|---|---|---|---|---|---|
| 3 | −135.5705 | 2.50 | 1.80518 | 25.4 | φ70 |
| 4 | −240.6086 | 110.00 | | | φ70 |
| 5 | 351.7050 | 10.0 | 1.51633 | 64.1 | φ70 |
| 6 | −271.7973 | 130.0 | | | φ70 |

TABLE 13

| SURFACE | R | INTERVAL | REFRACTION INDEX | DISPERSION | EFFECTIVE DIAMETER |
|---|---|---|---|---|---|
| STOP | | 40.0 | | | φ68 |
| 1 | −115.4936 | 12.40 | 1.51633 | 64.1 | φ70 |
| 2 | −66.48371 | 0.80 | | | φ70 |
| 3 | −62.76241 | 2.50 | 1.80518 | 25.4 | φ70 |
| 4 | −81.62645 | 110.00 | | | φ70 |
| 5 | 195.5611 | 10.0 | 1.51633 | 64.1 | φ70 |
| 6 | −279.3299 | 190.00 | | | φ70 |

Figures 18A, 18B:
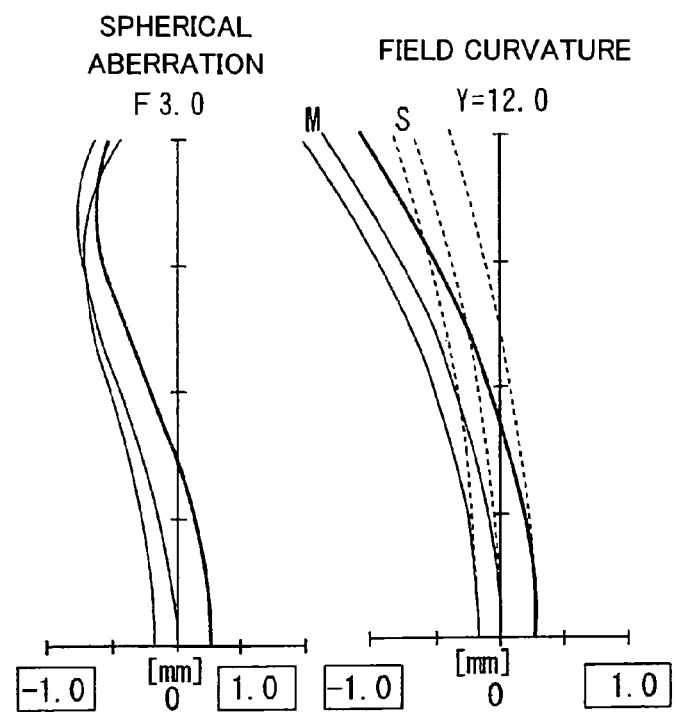
FIG. 18A and FIG. 18B are aberration views of a relay lens system corresponding to the configuration in FIG. 17A.

FIG. 18A and FIG. 18B are views of an aberration of a relay lens system corresponding to the configuration in FIG. 17A, wherein FIG. 18A shows the spherical aberration, and FIG. 18B shows field curvature.

Figures 19A, 19B:
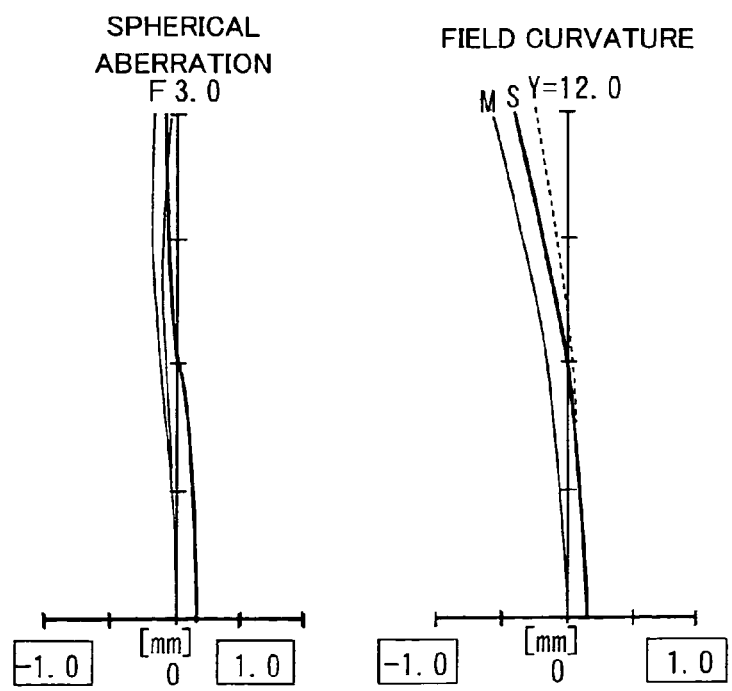
FIG. 19A and FIG. 19B are aberration views of a relay lens system corresponding to the configuration in FIG. 17B.

FIG. 19A and FIG. 19B are views of an aberration of a relay lens system corresponding to the configuration in FIG. 17B, wherein FIG. 19A shows the spherical aberration, and FIG. 19B shows field curvature.

Figure 20A:
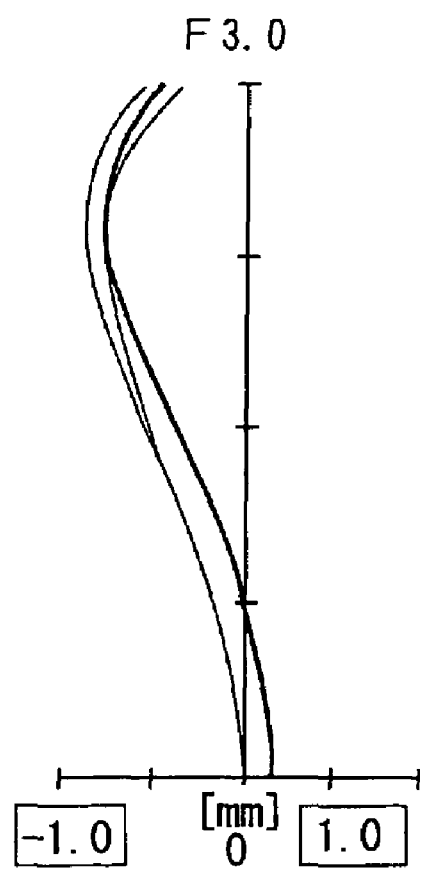
FIG. 20A and FIG. 20B are aberration views of a relay lens system corresponding to the configuration in FIG. 17C.
Figure 20B:
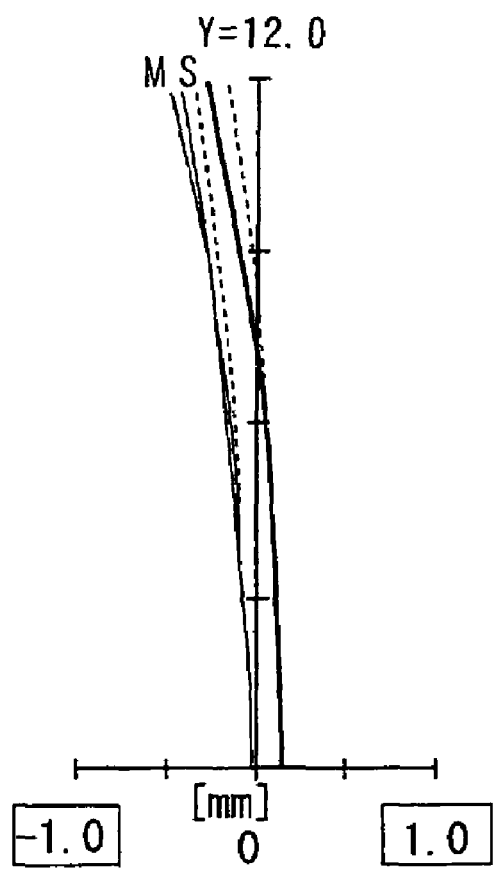

FIG. 20A and FIG. 20B are views of an aberration of a relay lens system corresponding to the configuration in FIG. 17C, wherein FIG. 20A shows the spherical aberration, and FIG. 20B shows field curvature.

In the aberration views in FIG. 18 to FIG. 20, a position of the surface of the second fly-eye lens is set at an aperture stop and evaluated as an aberration corresponding to an infinite light flux. This corresponds to an evaluation of focusing performance on the first fly-eye lens surface when the first fly-eye lens 105 is arranged at a focal point on the light source side of the second fly-eye lens 106.

In the configuration in FIG. 17A and FIG. 17C, wherein the condition formula (6) is not satisfied, an aberration arises much.

Also from this view point, it is known that the condition formula (6) has to be satisfied.

As explained above, according to the present embodiment, as a result that the ellipsoidal mirror 101a, a light source 101b arranged at a first focal point of the ellipsoidal mirror 101a, a stop 102 arranged closer to the light source side by a predetermined distance than a second focal point of the ellipsoidal mirror 101a, and the positive refractive collimator lens 103 for collimating a light flux emitted from the stop 102 to a parallel light flux are provided; and a condition formula of (0.01<L2/L1<0.06) is satisfied when assuming that a distance from an apex of the ellipsoidal mirror 101a to the second focal point thereof is L1 and that a distance from the second focal point of the ellipsoidal mirror to the stop is L2 (note that the light source side a positive distance); the illumination efficiency can be enhanced and unevenness of the brightness distribution can be suppressed.

Also, as a result that the image display device 111 (111-1 and 111-2), an illumination optical system for irradiating an illumination light from a light source to the image display device, and a projection optical system for projecting an image formed by the image display device are provided; the illumination optical system includes the first fly-eye lens 104 (104-1 and 104-2) and the second fly-eye lens 105 (105-1 and 105-2) arranged at each other's focal points, and the first lens group 106 (106-1 and 106-2) and the second lens group 108 (108-1 and 108-2) arranged over the mirror 107 (107-1 and 107-2) for bending an optical path; and the first and second lens groups have a same focal length but different back-focus; and the condition formulas (1) to (6) are satisfied; it is possible to install lenses in a common housing even when a size of the image display device and an optical path length of the prism are changed, and the development costs and the product cost can be reduced.

Fifth Embodiment

Figure 21:
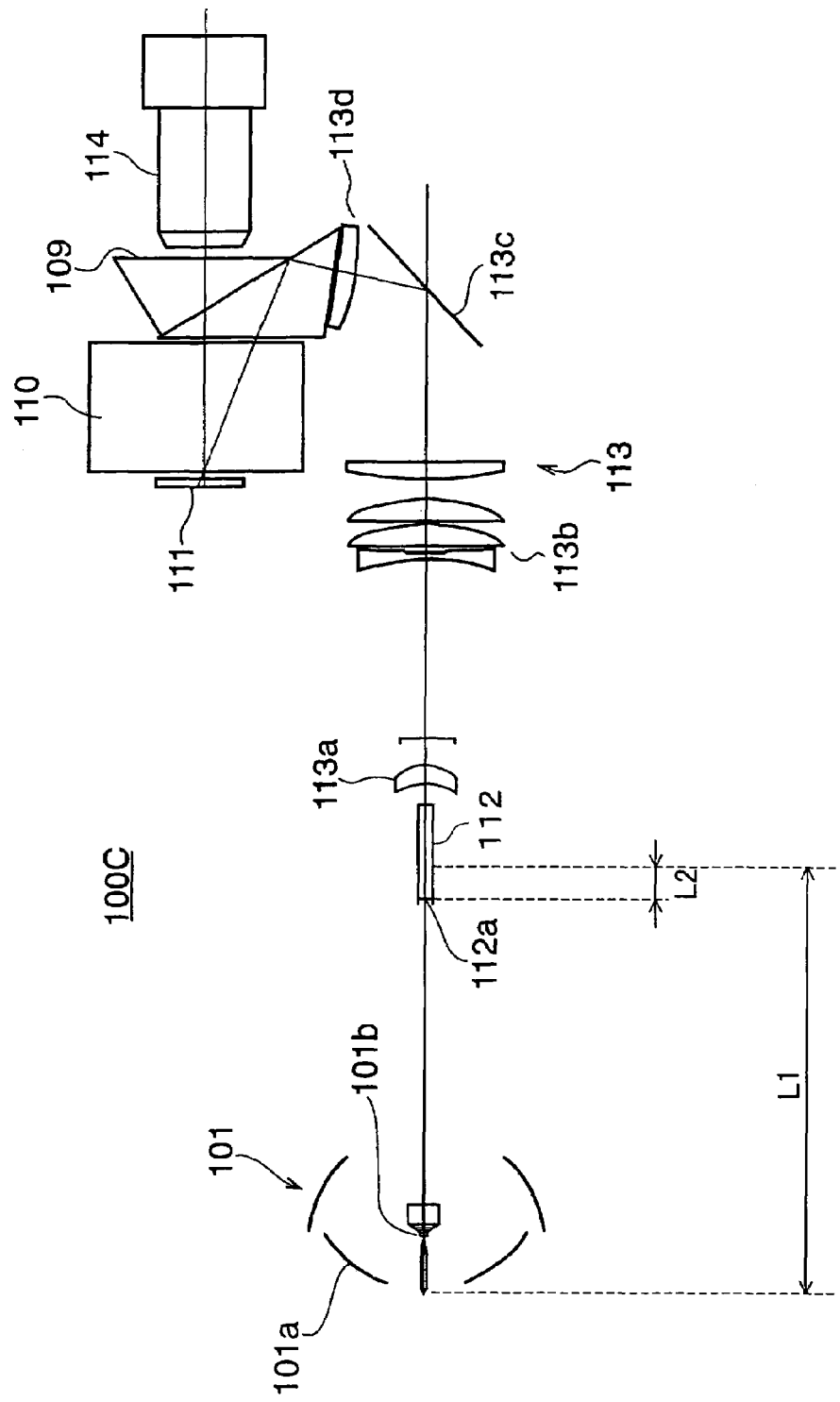
FIG. 21 is a view of the configuration of a projection type display apparatus according to a fifth embodiment of the present invention.

FIG. 21 is a view of the configuration of a projection type display apparatus according to a fifth embodiment of the present invention.

In the fifth embodiment, being different from the first to fourth embodiments explained above, an incident surface 112a of a rod integrator 112 is used as the stop and, instead of using a fly-eye lens, a relay lens system 113 including a first lens group 113a, a second lens group 113b, a mirror 113c an a third lens group 113d is provided between the rod integrator 112 and a prism 109.

Also in this case, the following condition is satisfied:

$$0.01 < L2/L1 < 0.06$$

where, L1 is a distance from an apex of the ellipsoidal mirror 101a to the second focal point thereof and,
L2 (the light source side a positive distance) is a distance from the second focal point of the ellipsoidal mirror to the incident surface 112a of the rod integrator 112.

Note that the condition formula is defined on the basis of an improvement of an illumination efficiency by about 2.5%, and it is defined to satisfy the following condition, for the improvement by about 5%.

(Condition Formula 3)

$$0.020 < L2/L1 < 0.040$$

The condition formula 3 is defined on the basis of an improvement of an illumination efficiency by about 5% in the case of the rod integrator system, and it is defined to satisfy the following condition, for the improvement of about 5% both in the case of the fly-eye lens system explained above and the rod integrator system.

(Condition Formula 4)

$$0.022 < L2/L1 < 0.040$$

As explained above, the light source unit of the fifth embodiment is the same as that in the first embodiment, so that other parts than the light source unit 101 will be explained.

The rod integrator 112 is an optical element formed by a translucent member processed to be a quadrangular prism shape or what formed by surrounding four sides with flat reflection mirrors and leaving a cavity from the incident end surface through the emission end surface. The incident end surface 112 of the rod integrator 112 serves as the stop in the first embodiment and blocks an unnecessary light flux.

Figure 22A:
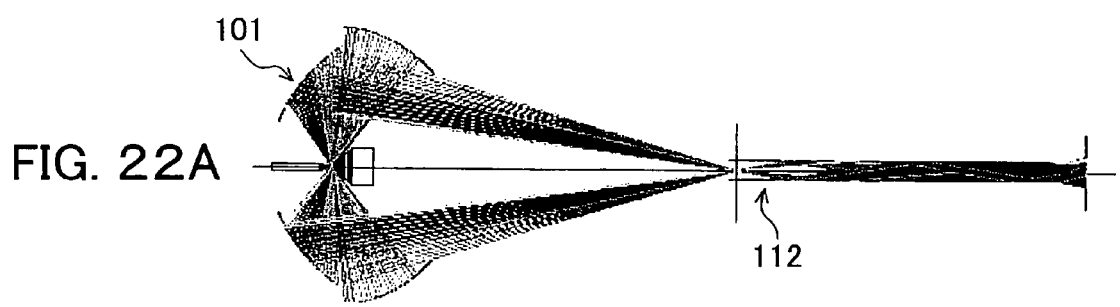
Figure 22B:
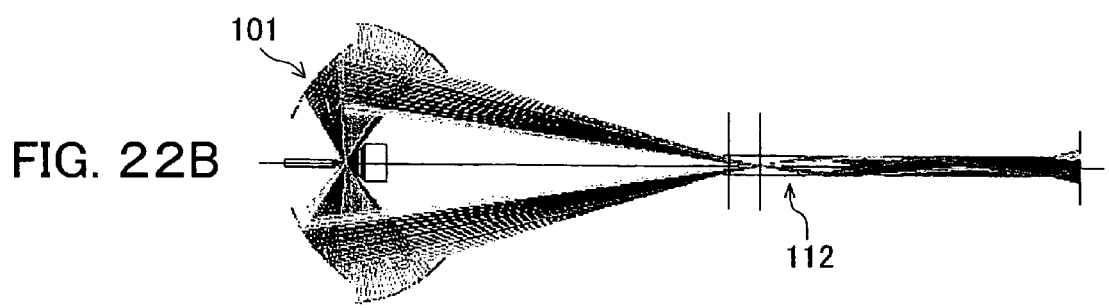

FIG. 22A and FIG. 22B are views showing positional relationships between a focal point of an ellipsoidal mirror and an incident end surface of a rod, wherein FIG. 22A shows a positional relationship between an apparatus of the related art and FIG. 22B shows a positional relationship according to the second embodiment.

FIG. 23 is a view showing changes of the DMD incident light intensity with respect to a deviation amount of a focal point of an incident end surface according to the second embodiment.

In the related art, the second focal point of the ellipsoidal mirror and the incident end surface of the rod integrator are brought to be identical, while in the fifth embodiment, the incident end surface 112 of the rod integrator is arranged to be displaced by 8 mm from the ellipsoidal second focal point to the light source side.

Thus, a light flux emitted to the rod integrator increases, consequently, a light flux emitted to the image display device 111 increases.

The relay lens system 113 functions to make a light emitted from the rod integrator 112 to form an image at a predetermined converging angle on the image display device 111.

In the rod integrator 112, as a result of reflecting inside for a plurality of times, an illumination distribution on the emission end surface becomes uniform, so that the image display device 111 being in an conjugation relationship with the rod integrator is also uniformly illuminated.

The rod integrator is 9.6×12.8 mm, a magnification power of the relay lens is set to be 3.32, and other optical element characteristics are same as those in the first embodiment.

In the present invention, when conducting calculations on the first and fifth embodiments, a light flux emitted to the image display element 111 is improved by 6% or so.

It should be understood by those skilled in the art that various modifications, combinations, sub-combinations and alternations may occur depending on design requirements and other factors insofar as they are within the scope of the appended claims or the equivalents thereof.

What is claimed is:

1. An illumination optical apparatus, comprising:
an ellipsoidal mirror;
a light source arranged at a first focal point of said ellipsoidal mirror;
a stop arranged closer to said light source side by a predetermined distance from a second focal point of said ellipsoidal mirror; and
a positive refractive collimator lens for collimating a light flux emitted from said stop to a parallel light flux, and
wherein the following condition is satisfied:

$0.01 < L2/L1 < 0.06$ where, L1 is a distance from an apex of said ellipsoidal mirror to the second focal point thereof and,
L2 (the light source side is a positive distance) is a distance from the second focal point of said ellipsoidal mirror to said stop.

2. An illumination optical apparatus as set forth in claim 1, further comprising:
a first fly-eye lens having a positive refractive power arranged on said collimator lens side;
a second fly-eye lens having a positive refracting power, arranged on the emission side being approximately in parallel with said first fly-eye lens; and
a relay lens system for guiding a light flux from said second fly-eye lens to an illumination surface.

3. An illumination optical apparatus, comprising:
an ellipsoidal mirror;
a light source arranged at a first focal point of said ellipsoidal mirror; and
a rod integrator arranged closer to said light source side by a predetermined distance from a second focal point of said ellipsoidal mirror, and
wherein the following condition is satisfied:

$0.01 < L2/L1 < 0.06$ where, L1 is a distance from an apex of said ellipsoidal mirror to the second focal point thereof, and
L2 (the light source side is a positive distance) is a distance from the second focal point of said ellipsoidal mirror to an incident surface of said rod integrator.

4. An illumination optical apparatus as set forth in claim 3, further comprising a relay lens system for guiding a light flux from said rod integrator to an illumination surface.

5. A projection type display apparatus, comprising:
an image display device; and
an illumination optical apparatus for emitting an illumination light to said image display device;
wherein said illumination optical apparatus comprises
an ellipsoidal mirror,
a light source arranged at a first focal point of said ellipsoidal mirror,
a stop arranged closer to said light source side by a predetermined distance from a second focal point of said ellipsoidal mirror,
a positive refractive collimator lens for collimating a light flux emitted from said stop to a parallel light flux,
a first fly-eye lens having a positive refracting power and arranged on said collimator lens side,
a second fly-eye lens having a positive refracting power and arranged on the emission side to be approximately in parallel with said first fly-eye lens, and
a relay lens system for guiding a light flux from said second fly-eye lens to an illumination surface, and
wherein the following condition is satisfied:

$0.01 < L2/L1 < 0.06$ where, L1 is a distance from an apex of said ellipsoidal mirror to the second focal point thereof, and
L2 (the light source side is a positive distance) is a distance from the second focal point of said ellipsoidal mirror to said stop.

6. A projection type display apparatus, comprising:
an image display device; and
an illumination optical apparatus for irradiating an illumination light to said image display device;
wherein said illumination optical apparatus comprises
an ellipsoidal mirror,
a light source arranged at a first focal point of said ellipsoidal mirror,
a rod integrator arranged closer to said light source side by a predetermined distance from a second focal point of said ellipsoidal mirror, and
a relay lens system for guiding a light flux from said rod integrator to an illumination surface, and
wherein the following condition is satisfied:

$0.01 < L2/L1 < 0.06$ where, L1 is a distance from an apex of said ellipsoidal mirror to the second focal point thereof, and
L2 (the light source side is a positive distance) is a distance from the second focal point of said ellipsoidal mirror to an incident surface of said rod integrator.

* * * * *